US012631832B1

(12) United States Patent
Higley et al.

(10) Patent No.: US 12,631,832 B1
(45) Date of Patent: May 19, 2026

(54) NON-REMOVABLE LATCH ASSEMBLY FOR VSFF FIBER-OPTIC CONNECTOR

(71) Applicant: US Conec Ltd., Hickory, NC (US)

(72) Inventors: Jason Higley, Hickory, NC (US);
Jillcha F Wakjira, Hickory, NC (US);
Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 286 days.

(21) Appl. No.: 18/438,685

(22) Filed: Feb. 12, 2024

Related U.S. Application Data

(60) Provisional application No. 63/445,546, filed on Feb. 14, 2023.

(51) Int. Cl.
G02B 6/42 (2006.01)
G02B 6/38 (2006.01)

(52) U.S. Cl.
CPC ......... G02B 6/3885 (2013.01); G02B 6/3825 (2013.01); G02B 6/387 (2013.01); G02B 6/4261 (2013.01)

(58) Field of Classification Search
CPC .... G02B 6/4261; G02B 6/3893; G02B 6/406; G02B 6/3825
See application file for complete search history.

(56) References Cited

U.S. PATENT DOCUMENTS

| | | | |
|---|---|---|---|
| 9,829,645 B2 | 11/2017 | Good et al. | |
| 9,880,361 B2 | 1/2018 | Childers et al. | |
| 11,016,250 B2 | 5/2021 | Higley et al. | |
| 11,733,466 B2 | 8/2023 | Higley et al. | |
| 2021/0003789 A1* | 1/2021 | Hsu | G02B 6/3893 |
| 2021/0263245 A1* | 8/2021 | Liu | G02B 6/4261 |
| 2023/0204872 A1* | 6/2023 | Takano | G02B 6/406 |
| | | | 385/78 |
| 2023/0358973 A1* | 11/2023 | Higley | G02B 6/3825 |
| 2024/0036266 A1* | 2/2024 | Takano | G02B 6/3893 |

* cited by examiner

*Primary Examiner* — Eric Wong
(74) *Attorney, Agent, or Firm* — Michael L Leetzow PLLC; Shubhrangshu Sengupta

(57) ABSTRACT

A very small form-factor (VSFF) fiber-optic connector has two latch assemblies, one on each side of the connector and being non-removable from the connector. The latch assemblies are movable between a forward active position and a rearward inactive position parallel to a longitudinal axis, and when the first latch assembly is in the forward active position, the second latch assembly is in the rearward inactive position for a first polarity configuration of the VSFF fiber-optic connector, and vice-versa for a second polarity configuration of the VSFF fiber-optic connector.

18 Claims, 25 Drawing Sheets

NON-REMOVABLE LATCH ASSEMBLY FOR VSFF FIBER-OPTIC CONNECTOR

REFERENCE TO RELATED CASES

This application claims priority under 35 U.S.C. § 119(e) to U.S. Provisional Patent Application Ser. No. 63/445,546, filed Feb. 14, 2023, all of the contents of which are incorporated by reference herein.

BACKGROUND OF THE INVENTION

Fiber-optic connectors that have at least two optical fibers secured therein have a polarity or orientation, ensuring that the transmitted signals are transmitted to the receiving side of the system they are connected within. There are a number of ways to change the polarity of the fiber-optic connector, including moving a latch used with the fiber-optic connector to a different side of the fiber-optic connector. However, in the world of very small form factor fiber-optic connectors (VSFF connectors), there can be difficulties in moving the latch (when used in the determination of polarity of the VSFF fiber-optic connector) to a different location on the VSFF fiber-optic connector and maintaining a connection with the VSFF fiber-optic connector. A detailed description of an example VSFF connector—the MDC connector—is presented in U.S. Pat. Nos. 11,016,250, and 11,733,466, both assigned to the current applicant and the contents of which are incorporated herein by reference in their entireties.

The present application is directed to a latch assembly that is non-removable upon an assembly of the VSFF fiber-optic connectors to change the polarity of the VSFF fiber-optic connectors without worrying about the connection of the latch assemblies to the VSFF fiber-optic connectors.

SUMMARY OF THE INVENTION

The present invention is directed to a very small form-factor (VSFF) fiber-optic connector supporting at least two optical fibers, the VSFF fiber-optic connector includes a housing having a main body formed by a top side, a bottom side, and two opposite side walls joining the top side to the bottom side, a separation between the top side and the bottom side being more than a separation between the two opposite side walls, the housing configured to receive the at least two optical fibers, the at least two optical fibers aligned along a fiber alignment axis to be equidistant from the two opposite side walls, the VSFF fiber-optic connector having a longitudinal axis, a boot disposed rearward of the main body and having a top boot rail and a bottom boot rail along at least a portion of a length of the boot, a first latch assembly slidably engaged with the top boot rail and the top side of the main body, wherein the first latch assembly is non-removable from the housing upon an assembly of the VSFF fiber-optic connector, and a second latch assembly slidably engaged with the bottom boot rail and to the bottom side of the main body, wherein the second latch assembly is also non-removable from the housing upon the assembly of the VSFF fiber-optic connector, and wherein each of the first latch assembly and the second latch assembly is movable between a forward active position and a rearward inactive position parallel to the longitudinal axis, and wherein when the first latch assembly is in the forward active position, the second latch assembly is in the rearward inactive position for a first polarity configuration of the VSFF fiber-optic connector, and vice-versa for a second polarity configuration of the VSFF fiber-optic connector.

In some embodiments, in the forward active position, only one of the first latch assembly and the second latch assembly engages a telecommunications structure.

In some embodiments, there is also a first single fiber fiber-optic ferrule configured to support one of the at least two optical fibers, and a second single fiber fiber-optic ferrule configured to support the other one of the at least two optical fibers.

In some embodiments, the first latch assembly and the second latch assembly each include projections to slidably engage the top boot rail and the bottom boot rail.

In other embodiments, the boot includes a top front latch and a top rear latch positioned adjacent the top boot rail to engage the first latch assembly.

In some embodiments, the boot further includes a bottom front latch and a bottom rear latch positioned adjacent the bottom boot rail to engage the second latch assembly.

In some embodiments, a longitudinal motion of the first latch assembly between the forward active position and the rearward inactive position is limited by the top front latch and the top rear latch, and wherein a longitudinal motion of the second latch assembly between the forward active position and the rearward inactive position is limited by the bottom front latch and the bottom rear latch.

In one embodiment, the longitudinal motion of the first latch assembly between the forward active position and the rearward inactive position is limited by the top front latch and the top rear latch.

In some embodiments, the first latch assembly has a top surface, the top surface having a projection to receive an external force for a movement between the forward active position and the rearward inactive position or vice-versa.

In some embodiments, the boot includes a first center channel between two rails of the top boot rail, the center channel configured to receive a guidance tab on a rear portion of the first latch assembly.

In some embodiments, wherein the boot includes a second center channel between two rails of the bottom boot rail, the second center channel configured to receive a guidance tab from a rear portion of the second latch assembly.

In some embodiments, the VSFF fiber-optic connector may include a multi-fiber fiber optic ferrule configured to support the at least two optical fibers.

In another aspect, the invention is directed to a very small form-factor (VSFF) fiber-optic connector supporting at least two optical fibers, the VSFF fiber-optic connector includes a housing having a main body formed by a top side, a bottom side, and two opposite side walls joining the top side to the bottom side, the main body having an opening extending along a longitudinal axis between a front end and a rear end of the main body to receive the at least two optical fibers, a separation between the top side and the bottom side being more than a separation between the two opposite side walls, the at least two optical fibers stacked vertically between the top side and the bottom side of the main body, a boot engaged with the rear end of the main body and having at least one boot rail along at least a portion of a length of the boot, the boot being bendable in a direction away from the longitudinal axis, at least one latch assembly slidably engaged with the at least one boot rail and to at least one of the top side or the bottom side of the main body on a same side as the at least one boot rail, wherein the at least latch assembly is non-removable from the housing upon an assembly of the VSFF fiber-optic connector, wherein the at least one latch assembly is movable between a forward active position and a rearward inactive position along the longitudinal axis, without removal of the at least one latch assembly from the VSFF fiber-optic connector, and wherein in the forward active position the at least one latch assembly is configured to engage an adapter or a transceiver receptacle.

In yet another aspect, the invention is directed to a bag of parts for assembling a very small form-factor (VSFF) duplex fiber-optic connector, the bag of parts includes a housing having a main body formed by a top side, a bottom side, two opposite side walls joining the top side to the bottom side, and an opening, a separation between the top side and the bottom side being more than a separation between the two opposite side walls, the opening configured to receive at least two optical fibers, the at least two optical fibers upon an assembly of the VSFF duplex fiber-optic connector are aligned along a fiber alignment axis to be equidistant from the two opposite side walls, a boot configured to engage the main body upon the assembly and having a top boot rail and a bottom boot rail along a portion of a length of the boot, each of the top boot rail and the bottom boot rail having two rails and a center channel between the two rails, a first latch assembly having a guidance tab for slidable non-removable engagement with one of the top boot rail or the bottom boot rail and to at least one of the top side or the bottom side of the main body, wherein the first latch assembly being non-removable from the housing upon an assembly of the VSFF duplex fiber-optic connector, wherein upon the assembly of the VSFF duplex fiber-optic connector, the first latch assembly is movable between a forward active position and a rearward inactive position along a longitudinal axis, without removal from the VSFF duplex fiber-optic connector, and wherein the boot includes a top front latch and a top rear latch positioned between the two rails of the top boot rail to engage the first latch assembly.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
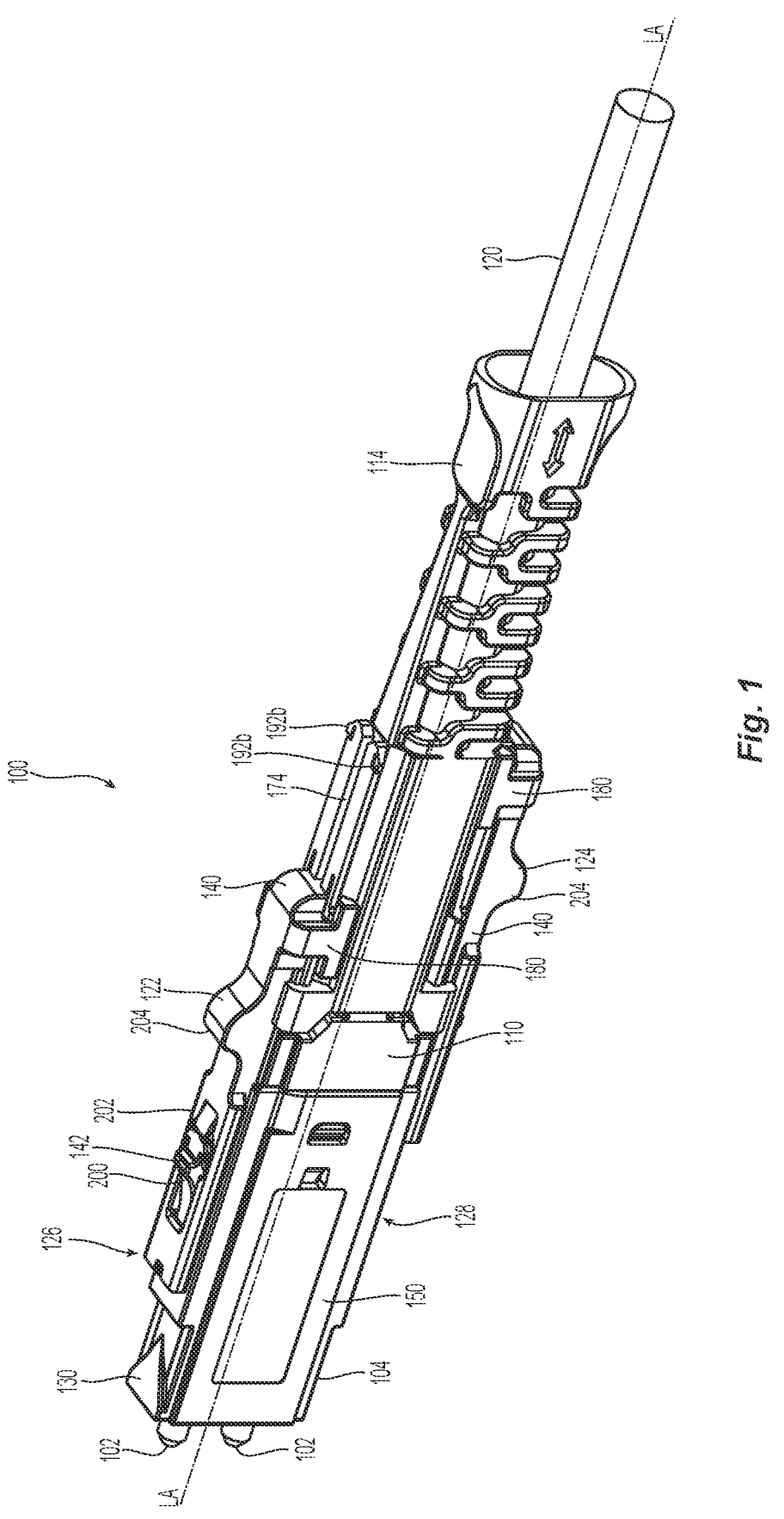
FIG. 1 is a perspective view of one embodiment of a VSFF fiber-optic connector with two latch assemblies according to the present invention, one in an active position and one in an inactive position.
Figure 2:
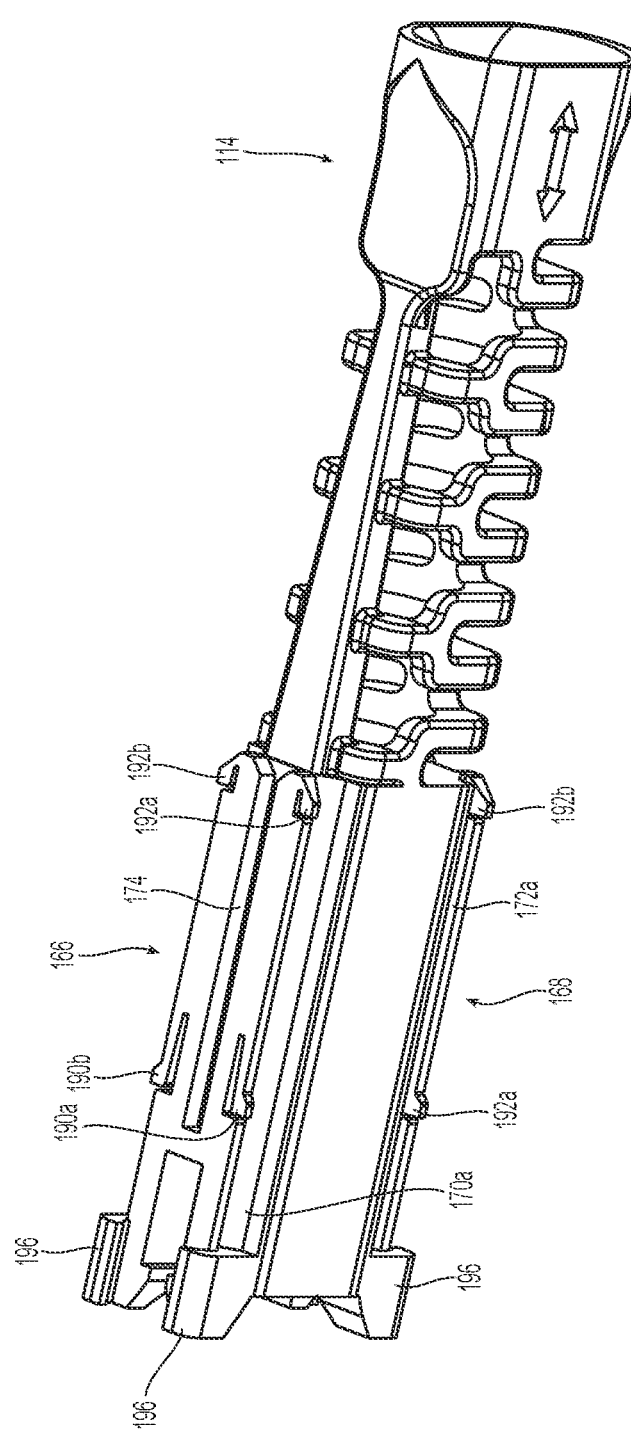
FIG. 2 is a perspective view of one embodiment of a boot that can be used with the VSFF fiber-optic connector of FIG. 1.
Figure 3:
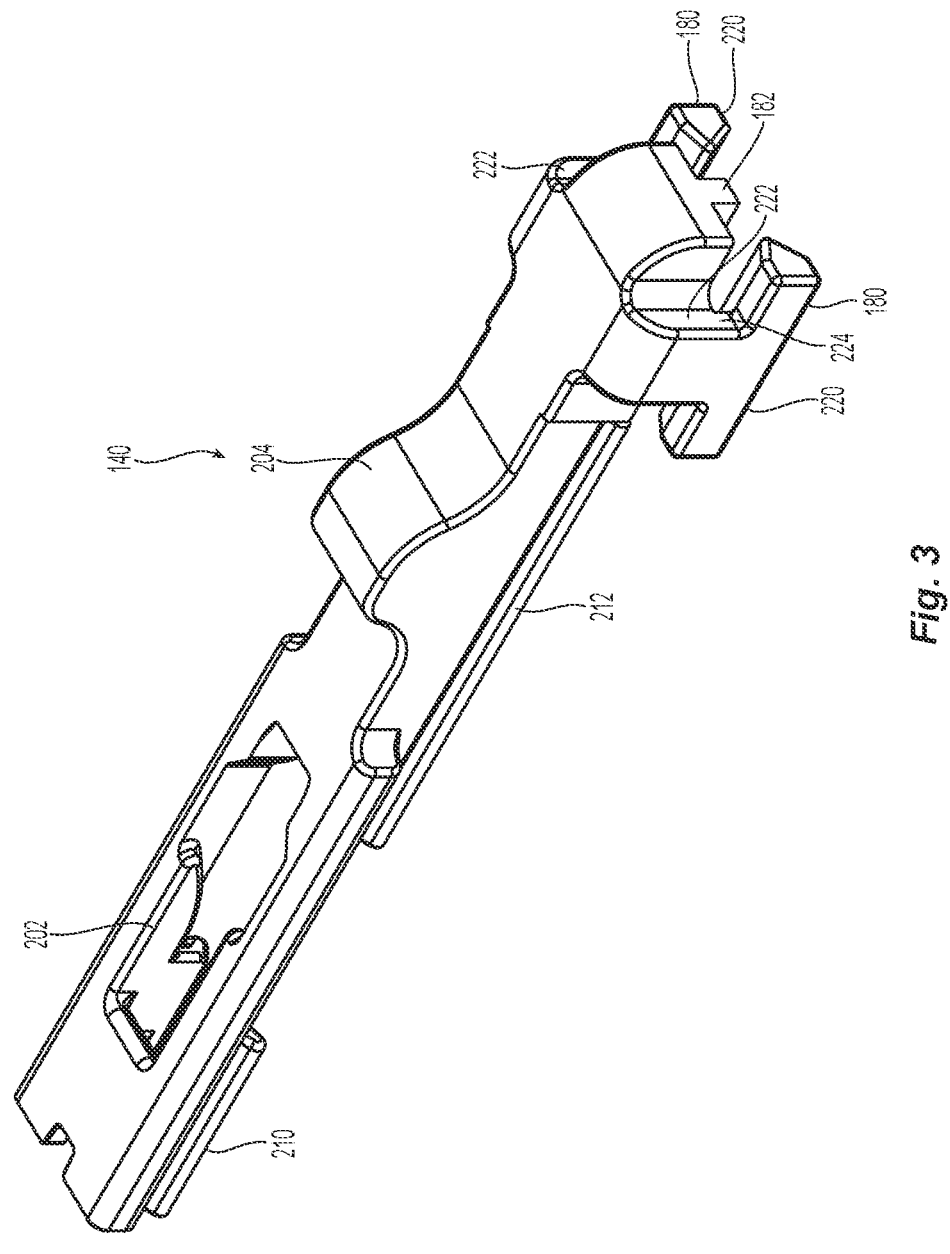
FIG. 3 is a perspective view from a top side of one embodiment of an assembly body, one part of the latch assembly, that can be used with the VSFF fiber-optic connector of FIG. 1.
Figure 4:
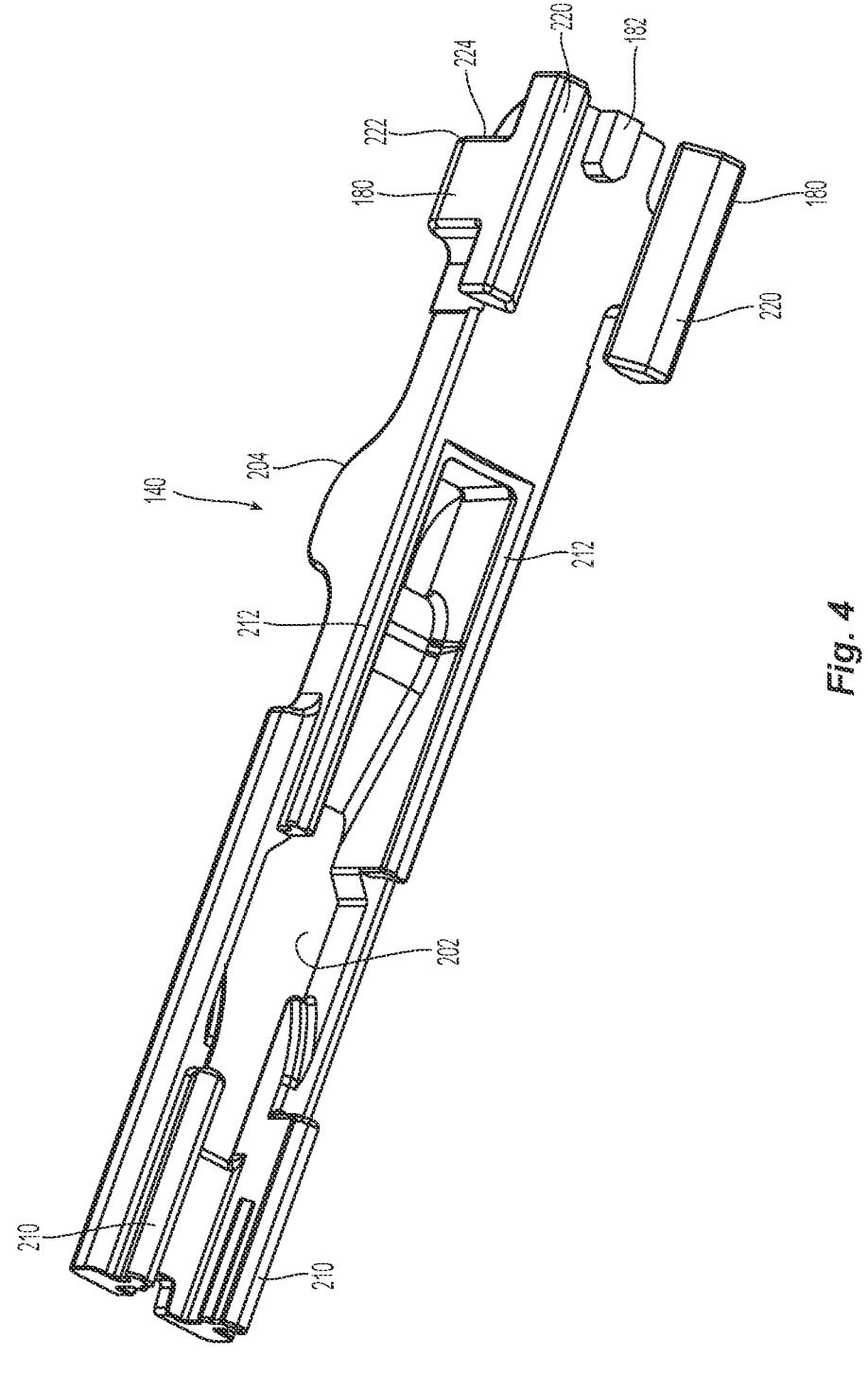
FIG. 4 is a perspective view from a bottom side of the assembly body of FIG. 3.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber-optic connector would meet with another fiber-optic connector or device, while the term "rear" or "rearward" is used to mean the direction from which the optical fibers enter into the fiber-optic ferrule or fiber-optic connector. Each of the components will therefore have a front and rear, and the two respective fronts or forward portions of opposing ferrules would engage one another. Thus, in FIG. 1 the "front" of the VSFF fiber-optic connector is on the left side and "forward" is to the left and into the page. "Rearward" or "rear" is that part of the VSFF fiber-optic connector that is on the rear side of the page and "rearward" and "backward" is toward the right and out of the page.

One embodiment of a very small form-factor (VSFF) fiber-optic connector 100 ("connector 100") according to the present invention is illustrated in FIGS. 1-8. The connector 100 includes ferrules 102, a housing 104, ferrule holders 106, springs 108, spring push 110, crimp body 112, and a boot 114. See FIG. 5. There may be other features such as lead-in tubes 116, among other components. The ferrules 102 support optical fibers 118 that are in a cover 120 and in this embodiment, there would be two optical fibers 118. The connector 100 also has two latch assemblies 122,124. As detailed below, the two latch assemblies 122,124 are the same, one is on the top side 126 of the connector 100 and one is on the bottom side 128. The assignment of top and bottom of the connector 100 is for ease of reference within this patent, and may be reversed from that which is illustrated. The connector 100 also has a key 130 to further help with any polarity issues that may arise, e.g., providing a visual indicator of polarity. That is, the key 130 is illustrated as being on the top side 126, but may alternatively be on the bottom side 128. The latch assemblies 122,124 preferably have an assembly body 140 and a latch body 142. See FIGS. 3-5.

Figure 5:
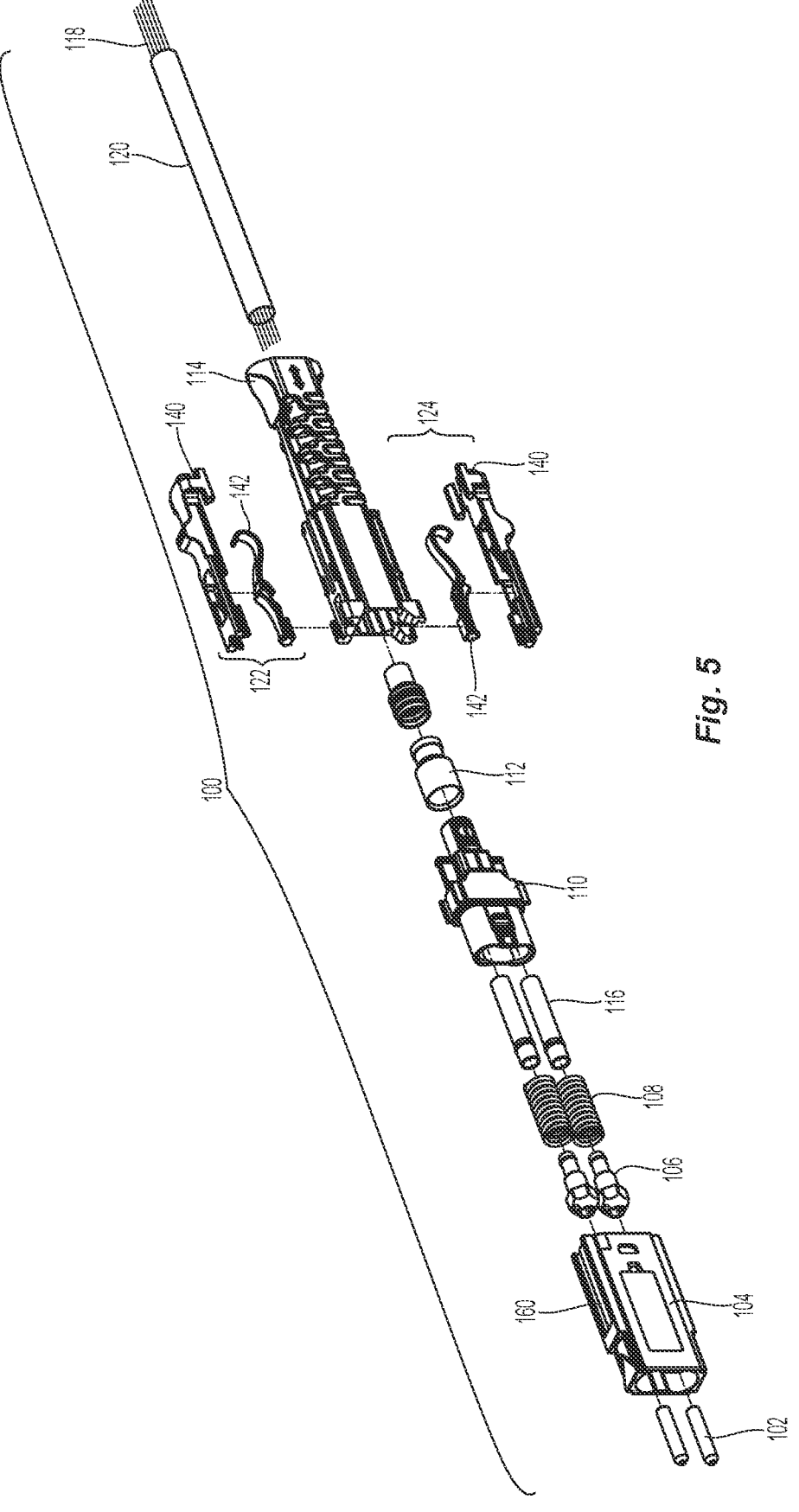
FIG. 5 is an exploded view of the VSFF fiber-optic connector of FIG. 1.
Figure 5A:
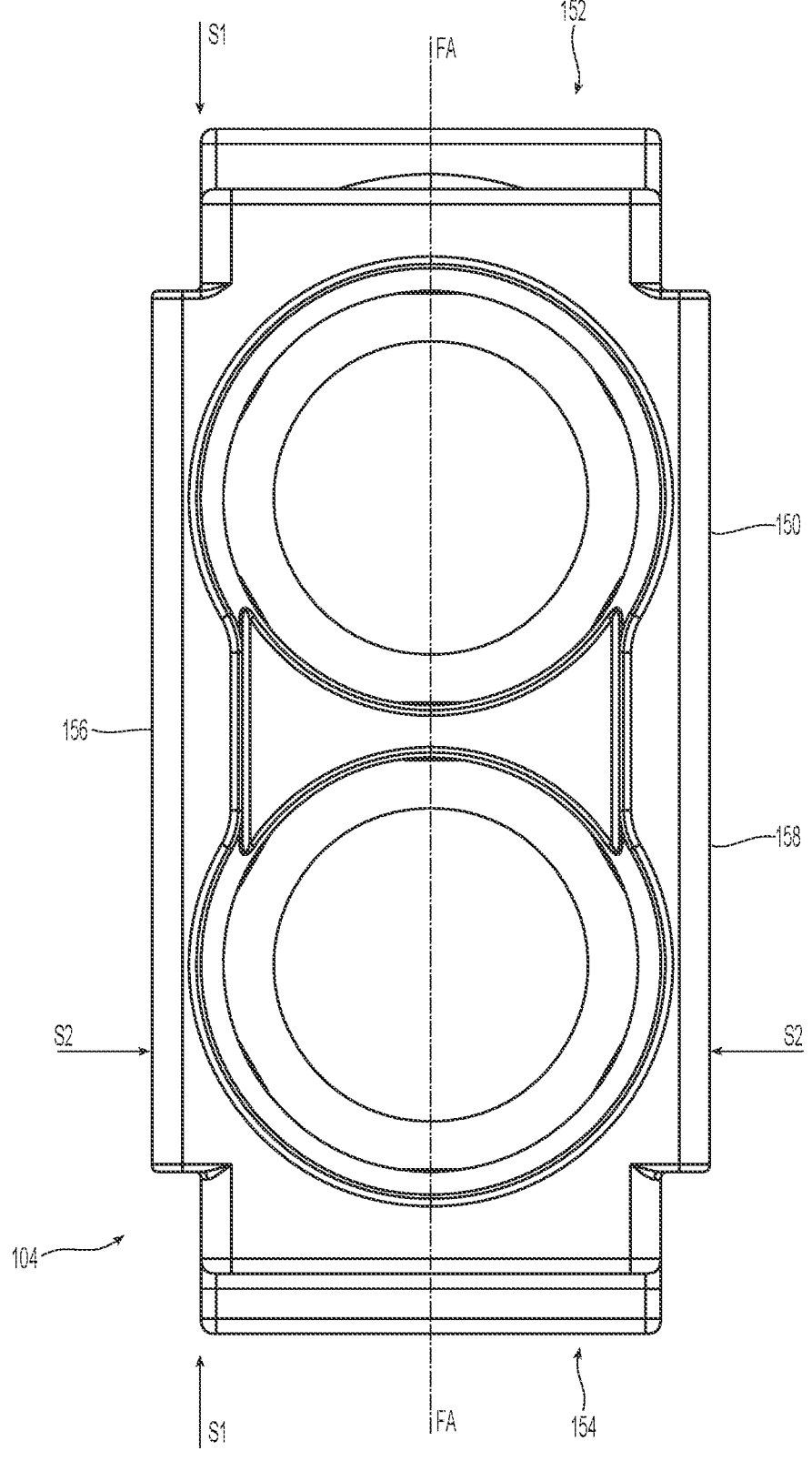
FIG. 5A is a front elevation view of a housing of the VSFF fiber-optic connector of FIG. 1 with other components removed.

The housing 104 has a main body 150 formed by a top side 152, a bottom side 154, and two opposite side walls 156,158, the opposite side walls 156,158 joining the top side 152 to the bottom side 154. There is a separation S1 between the top side 152 and the bottom side 154 that is larger or more than a separation S2 between the two opposite side walls 156,158. The housing 104 is configured to receive the at least two optical fibers 118. The at least two optical fibers 118 are aligned along a fiber alignment axis FA (see FIG. 5A) to be equidistant from the two opposite side walls 156,158. The connector 100 also has a longitudinal axis LA (see FIG. 1). The housing 104 includes on both the top side 152 and the bottom side 154 a rail receiving portion 160 (see, e.g., FIG. 5) to receive a front portion of the latch assemblies 122,124. The housing also includes on either side of the rail receiving portions 160 a shoulder 162 that extends from a rear 164 of the main body 150 towards the front. As noted below, the shoulder 162 provides a path and support for a portion of the latch assemblies 122,124.

The boot 114 is disposed rearward of the main body 150 of the housing 104 and has a top side 166 and a bottom side 168. The boot 114 can be attached to the housing 104 in a number of ways and still fall within the scope of the present invention. The boot 114 has two top boot rails 170a,170b on the top side 166 and bottom boot rails 172a,172b on the bottom side 168 and along at least a portion of a length of the boot 114. See, e.g., FIGS. 2, 9, and 12, and 13. These boot rails 170a,170b,172a,172b support and guide projections 180 of the latch assemblies 122,124. See FIGS. 3, 4, 9, and 12-13. The top side 166 and the bottom side 168 each have a center channel 174 that extends along a length of the boot 114 to receive a guidance tab 182 on the latch assemblies 122,124. See FIGS. 2-4. The combination of the center channel 174 and the guidance tab 182 helps to stabilize the latch assemblies 122,124 as they move along the connector 100 as discussed more below.

The boot 114 also has on the top side 166 and the bottom side 168 and on opposite sides of the center channel 174 a set of front latches 190a,190b and a set of rear latches 192a,192b. See FIG. 2. (Since the top side 166 and the bottom side 168 of the boot 114 are the same, only the top side latches will be explained). The set of top front latches 190a,190b are used to retain the latch assemblies 122,124 in a forward position, and the set of top rear latches 192a,192b are to retain the latch assemblies 122,124 in a rearward position. See, e.g., FIGS. 12 and 13. The boot 114 also has on the top side 166 and the bottom side 168 a clip 196 that is adjacent a front end 198. The clip 196 engages the latch assemblies 122,124 to provide guidance and support during the movement of the latch assemblies 122,124.

As noted above, each of the latch assemblies 122,124 have an assembly body 140 and a latch body 142. The latch body 142 is at least partially disposed within the assembly body 140. A front portion 200 of the latch body 142 extends through an opening 202 in the assembly body 140 to engage an adapter 300 (see FIGS. 14 and 15). The other end of the latch body 142 is disposed within a dome or projection 204. Pulling on the dome or projection 204 of the assembly body 140 also pulls on the latch body 142, causing the front portion 200 to be pulled rearward and downward into the assembly body 140, thereby releasing the connector 100 from the adapter 300. Pushing on or otherwise exerting pressure on the dome 204 causes the latch assemblies 122,124 to move forward provided the latch assembly that is acted upon is not engaging latches 190a,190b,192a,192b on the boot 114.

The assembly body 140 has two sets of projections along the edges thereof. The first set of projections 210 are towards the front of the assembly body 140 and engage the rail receiving portion 160. See FIGS. 4 and 7. The second set of projections 212 are rearward of the first set 210 and engage the clip 196 on the boot 114. The first set of projections 210 and the second set of projections 212 can be joint or disjoint with each other.

The latch assemblies 122,124 have the projections 180 on either side towards a rear portion thereof. In one embodiment, they have an inverted t-shape, allowing the cross portion 220 to ride in the boot rails 170a,170b,172a,172b. The cross portion 220 preferably has a complementary configuration to allow for maximum engagement with the boot rails 170a,170b,172a,172b. On the back side 222 is a rearward facing surface 224 that engages the latches 190a, 190b,192a,192b. See FIGS. 12 and 13. Thus, the motion or sliding of the latch assemblies 122,124 is limited by the latches 190a,190b,192a,192b for movement between the active and the inactive positions. Under normal usage of the connector 100, the latch assemblies 122,124 are always secured to the connector 100. That is, a polarity change operation does not release or remove the latch assemblies 122,124 from the connector 100 and latch assemblies 122, 124 are always engaged or in contact with the connector 100 making the latch assemblies 122,124 non-removable from the connector 100. The sliding motion of the latch assemblies 122,124 along the longitudinal axis LA changes the polarity of the connector 100 without physically detaching latch assemblies 122,124 from the connector 100.

Figure 6:
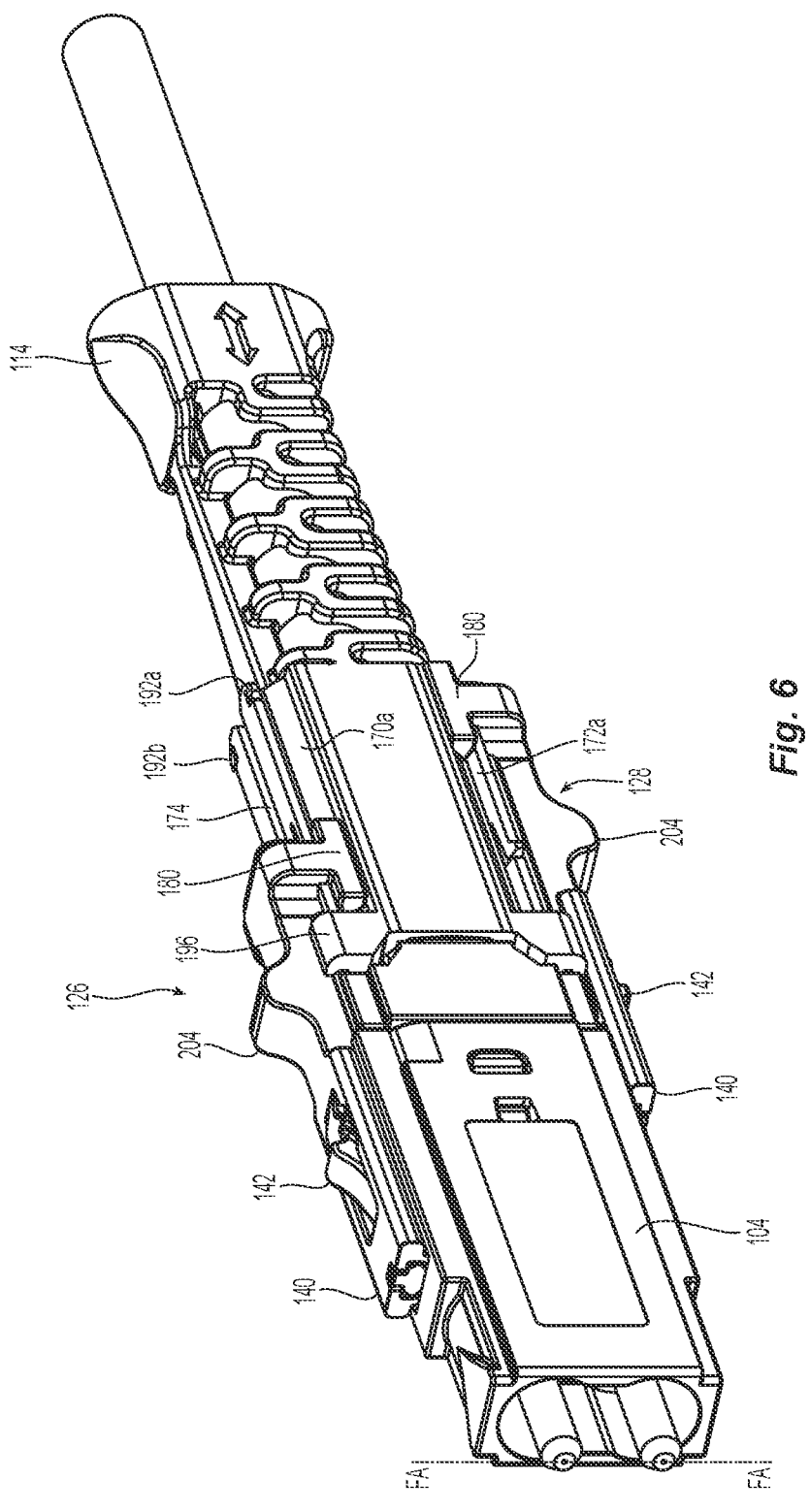
FIG. 6 is a left perspective view of the VSFF fiber-optic connector in FIG. 1 with a top latch assembly in an active position and a bottom latch assembly in an inactive position.
Figure 7:
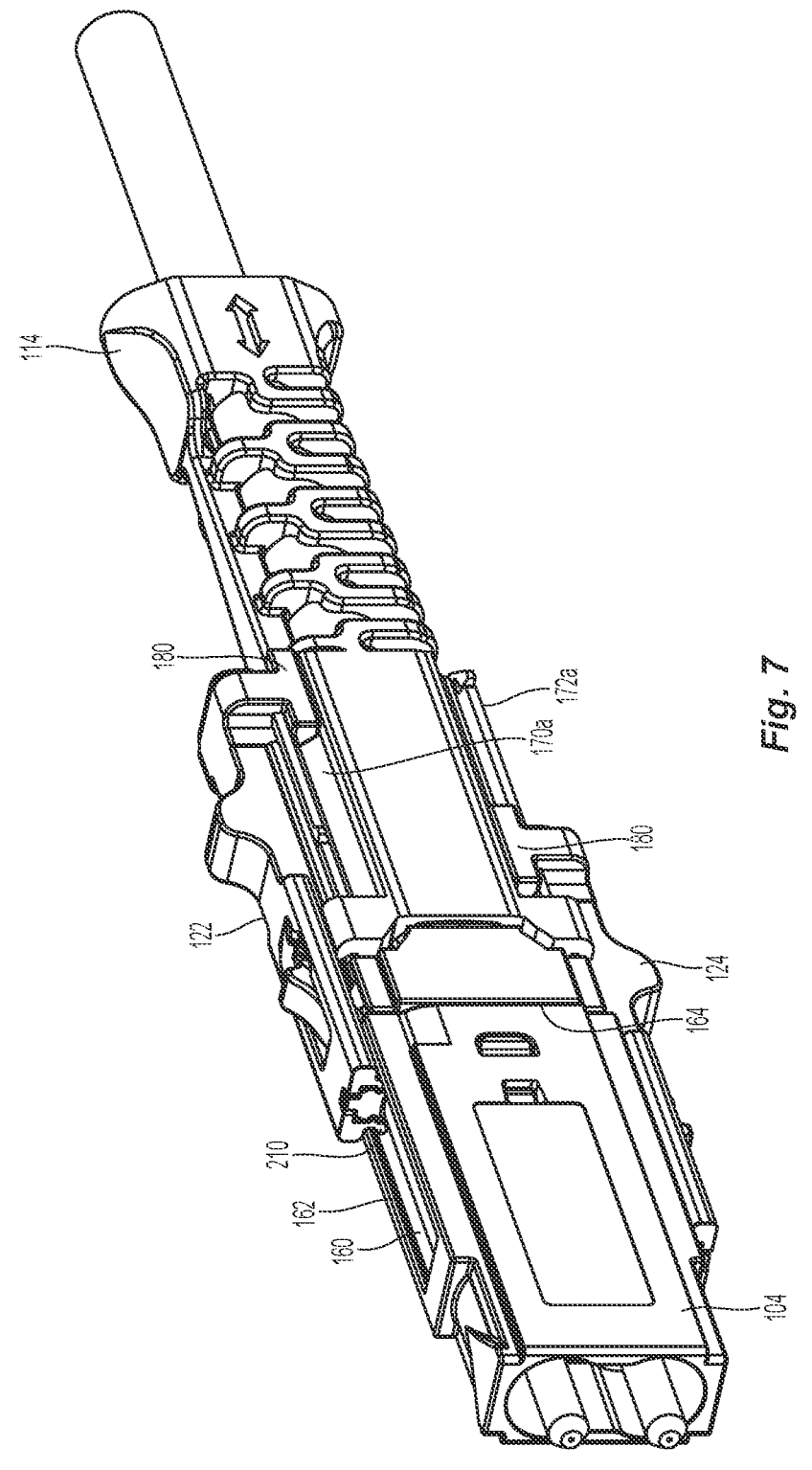
FIG. 7 is a left perspective view of the VSFF fiber-optic connector in FIG. 6 with the top latch assembly moved to an inactive position and a bottom latch assembly moved to an active position.
Figure 8:
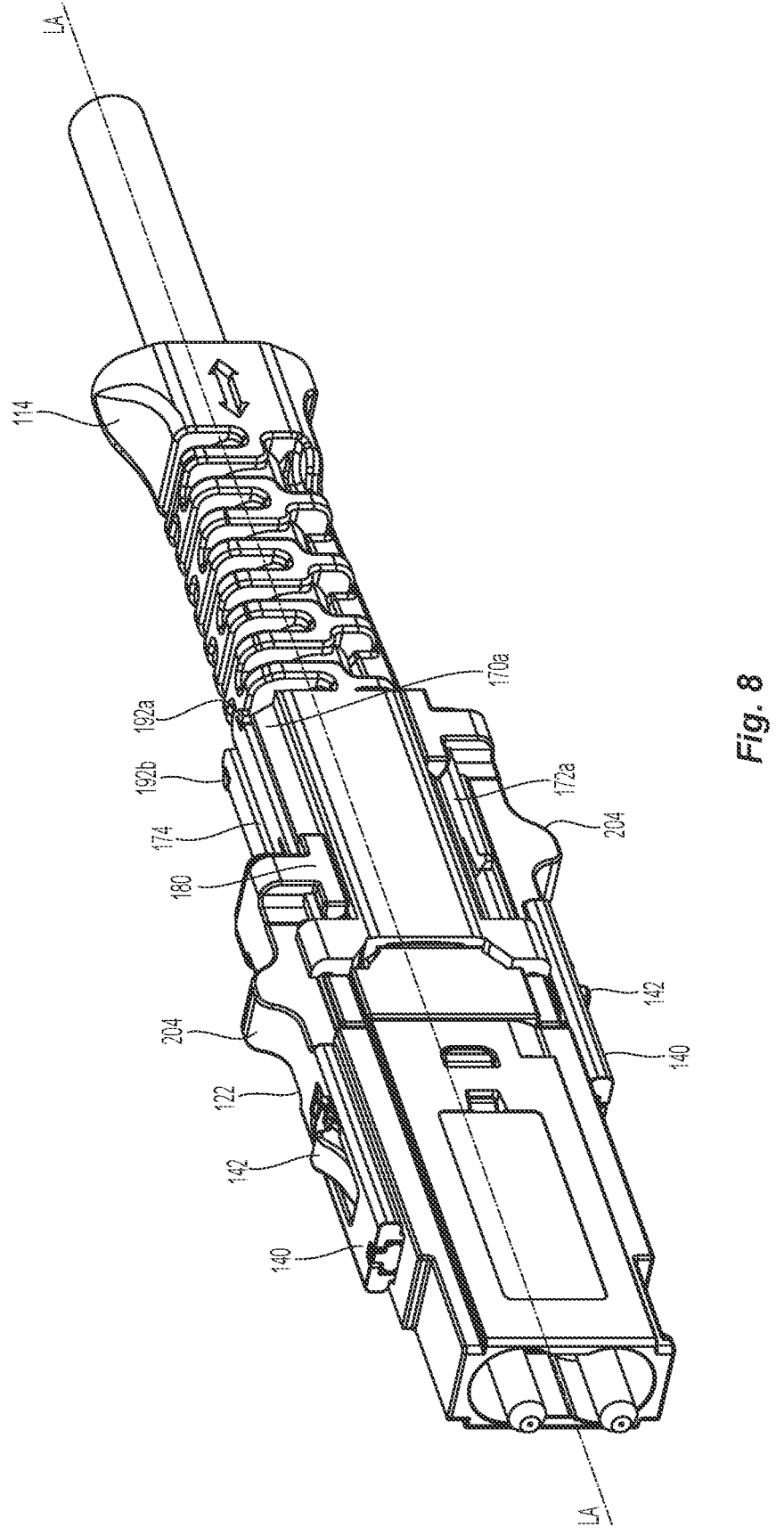
FIG. 8 is a left perspective view of the VSFF fiber-optic connector in FIG. 7 with VSFF fiber-optic connector flipped 180 degrees to address polarity issues.
Figure 9:
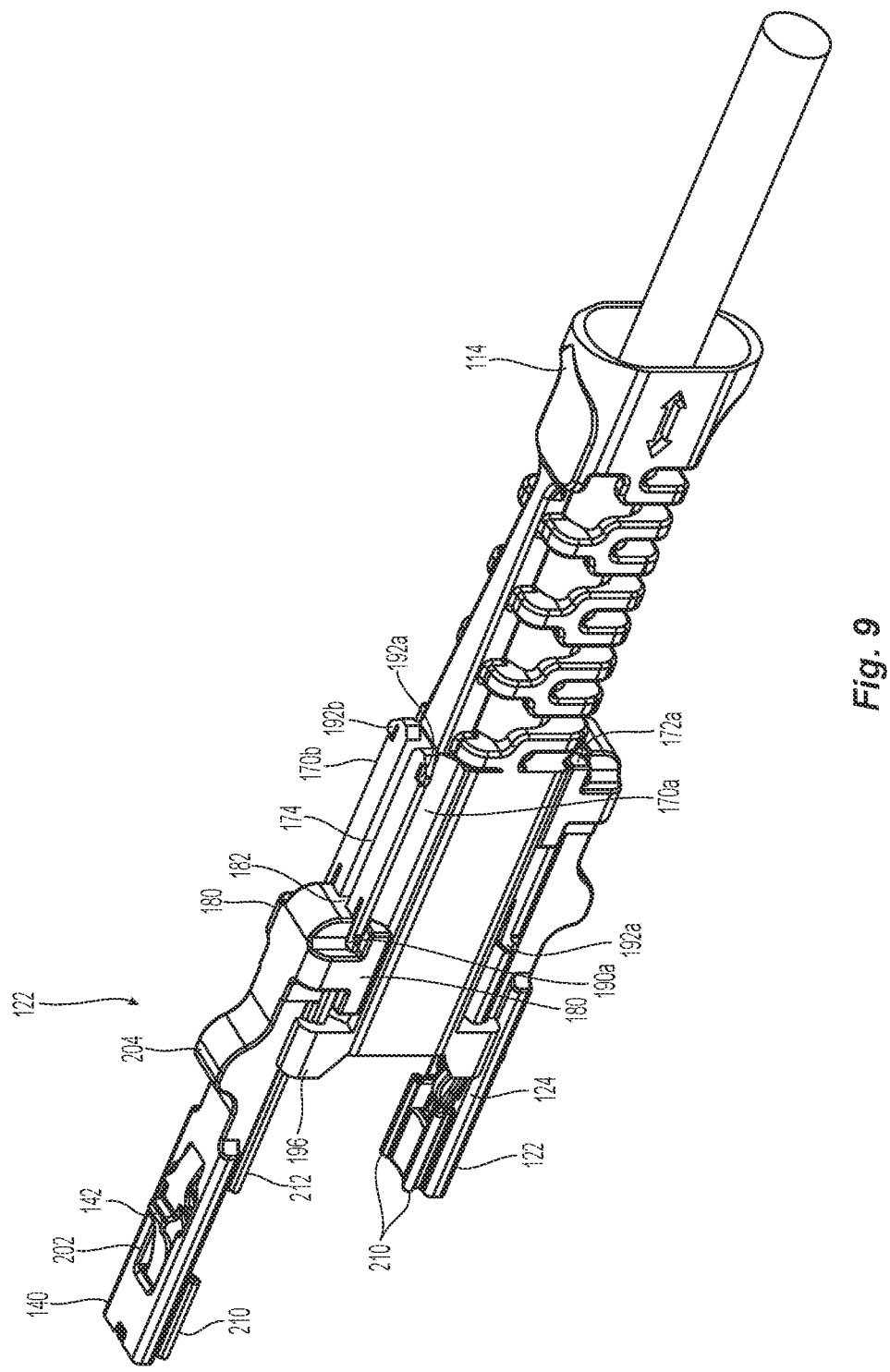
FIG. 9 is a left perspective view of the boot and latch assemblies of VSFF fiber-optic connector in FIG. 1 with a top latch assembly in an active position and a bottom latch assembly in an inactive position.
Figure 10:
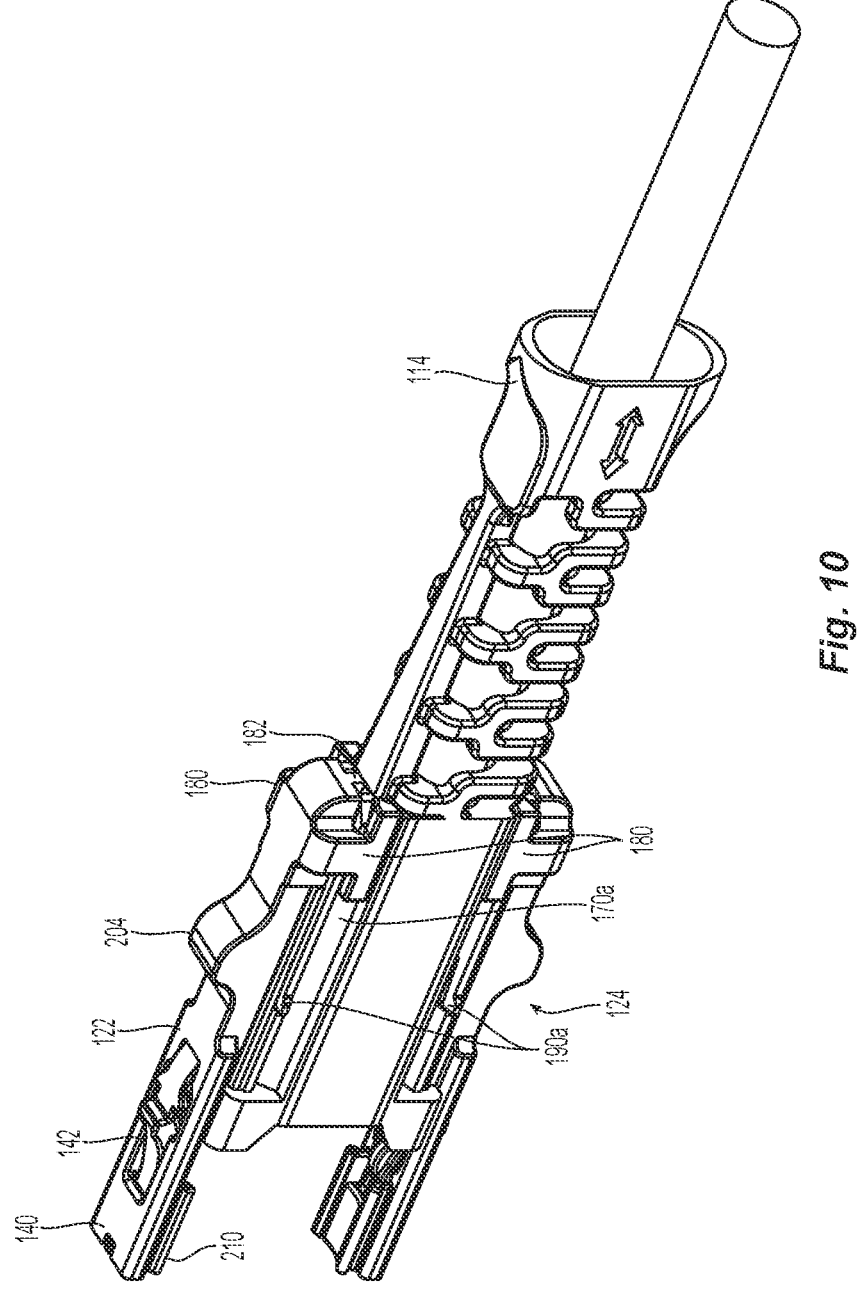
FIG. 10 is a left perspective view of the boot and latch assemblies of VSFF fiber-optic connector in FIG. 1 with a top latch assembly moving to an inactive position and a bottom latch assembly in an active position.
Figure 11:
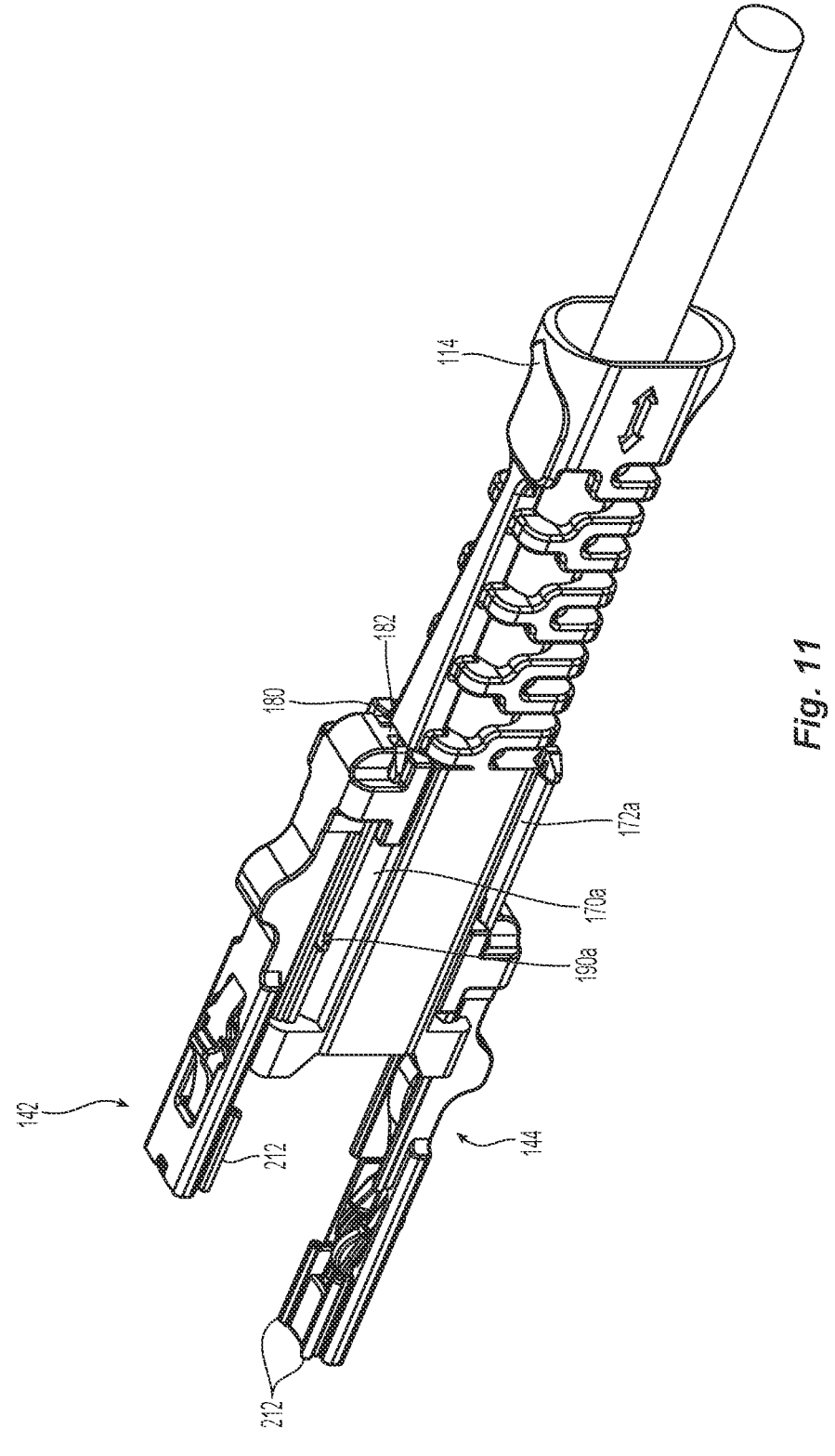
FIG. 11 is a left perspective view of the boot and latch assemblies of VSFF fiber-optic connector in FIG. 1 with a top latch assembly in an inactive position and a bottom latch assembly in an active position.
Figure 12:
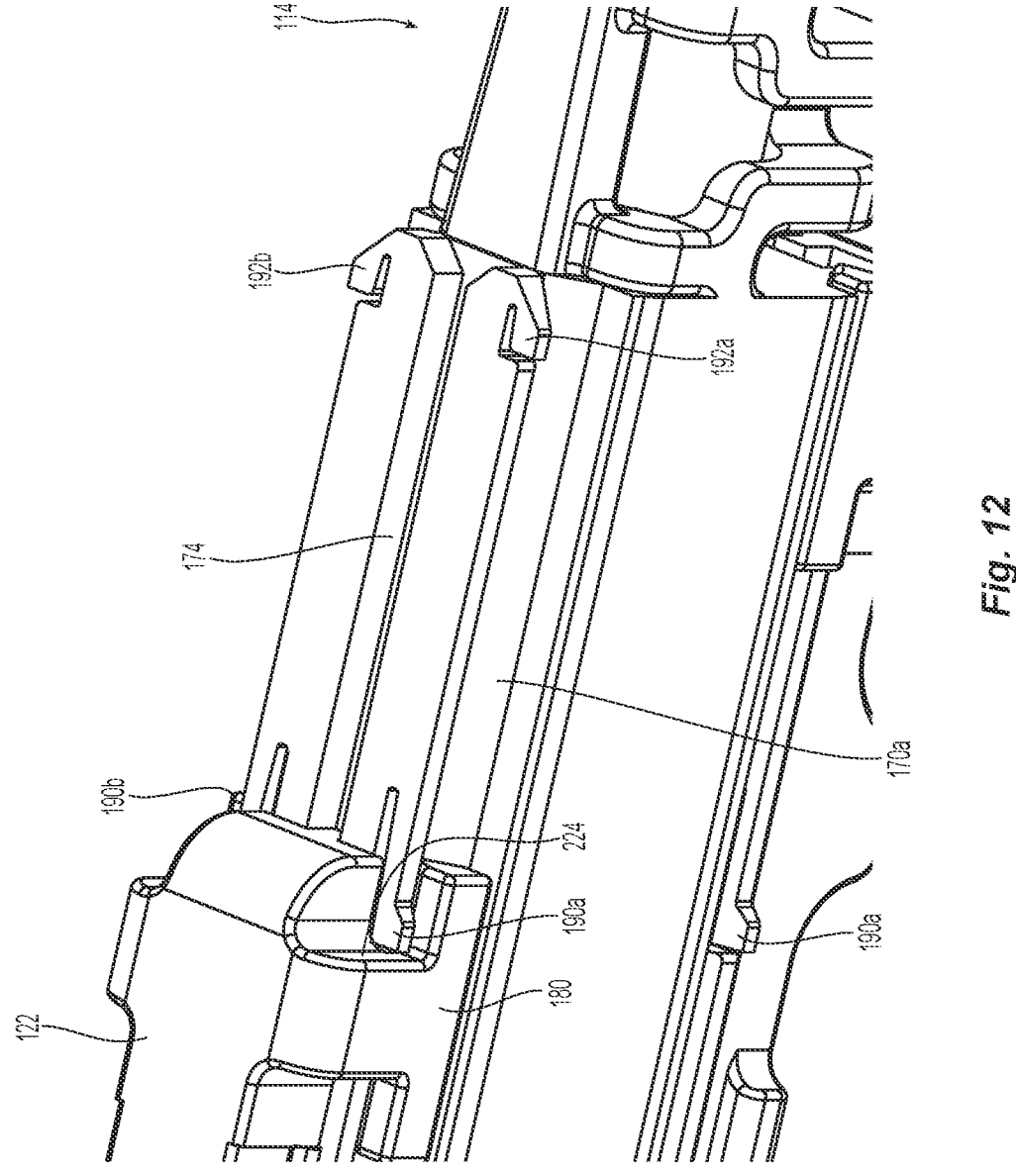
FIG. 12 is an enlarged view of the assembly body engaging a front latch of the boot.
Figure 13:
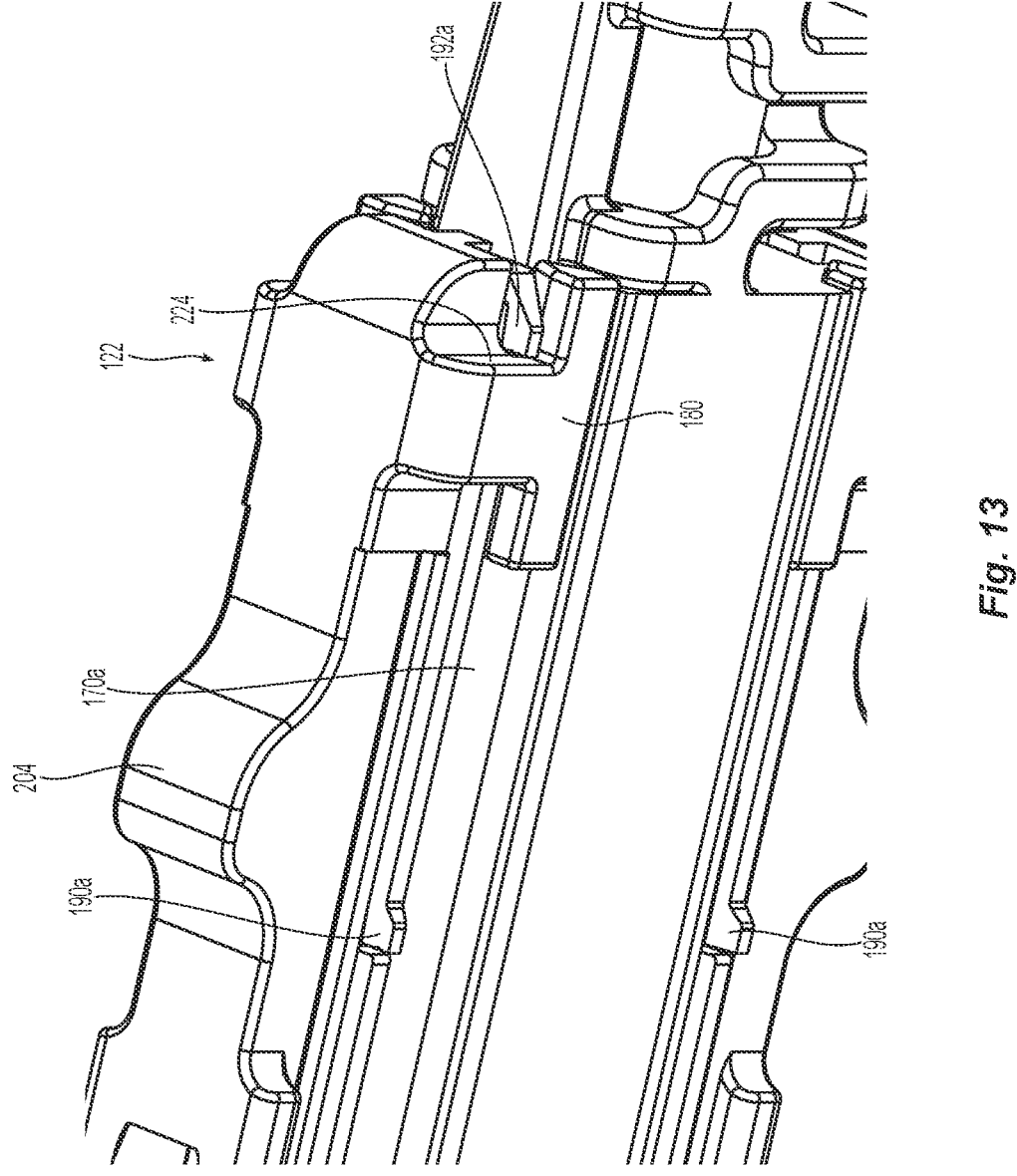
FIG. 13 is an enlarged view of the assembly body engaging a rear latch of the boot.

To change the polarity of the connector 100, the latch assemblies 122,124 have to be moved—the front latch assembly needs to be moved rearwardly and the rearward latch assembly needs to be moved forward. That is explained with reference to FIGS. 6-11. FIGS. 6-8 illustrate this with the whole connector 100, while FIGS. 9-11 are just the boot 114 and the latch assemblies 122,124. FIGS. 12 and 13 illustrate the interaction of the latches 190a,190b,192a,192b on the boot 114 with the latch assemblies 122,124.

Figure 14:
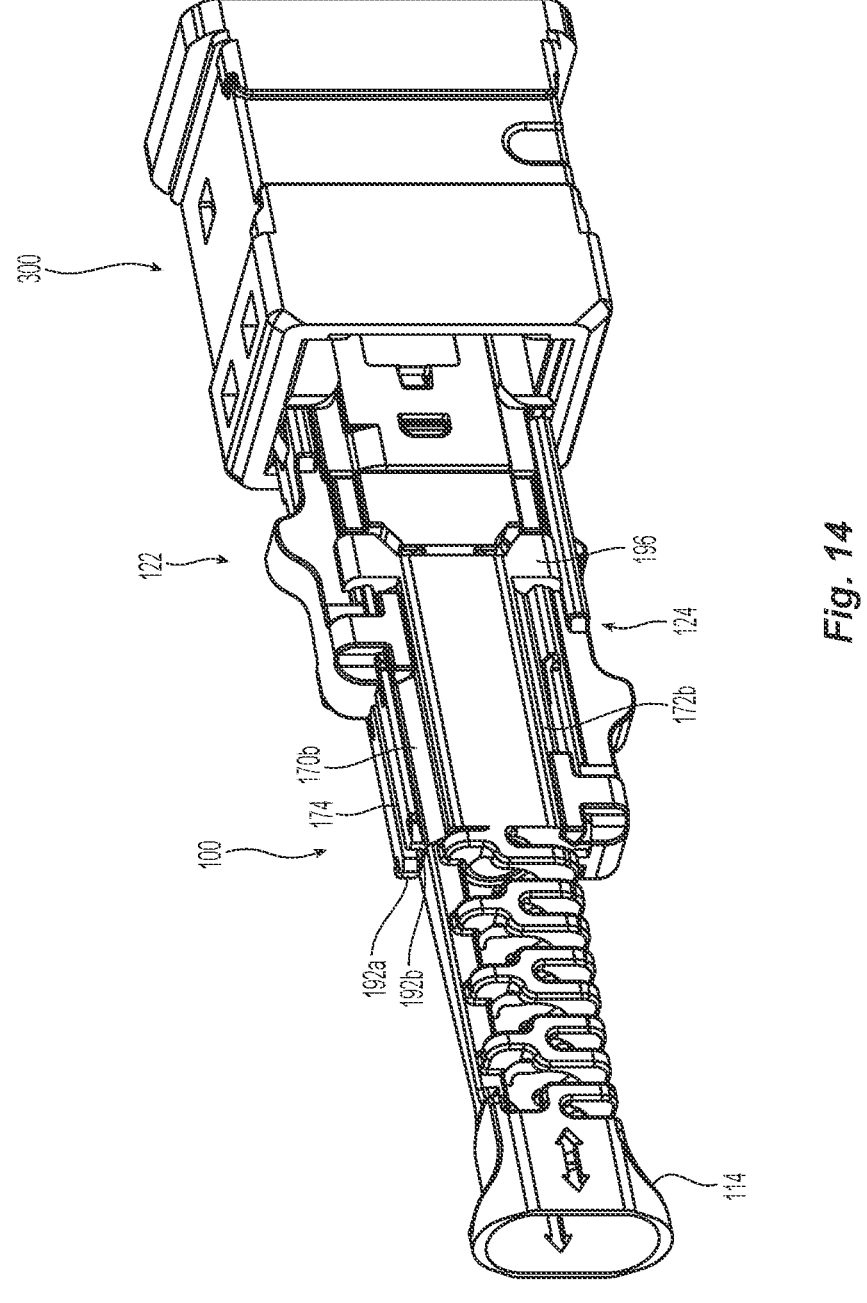
FIG. 14 is a left perspective view of the VSFF fiber-optic connector in FIG. 1 inserted into an adapter/transceiver receptacle.
Figure 15:
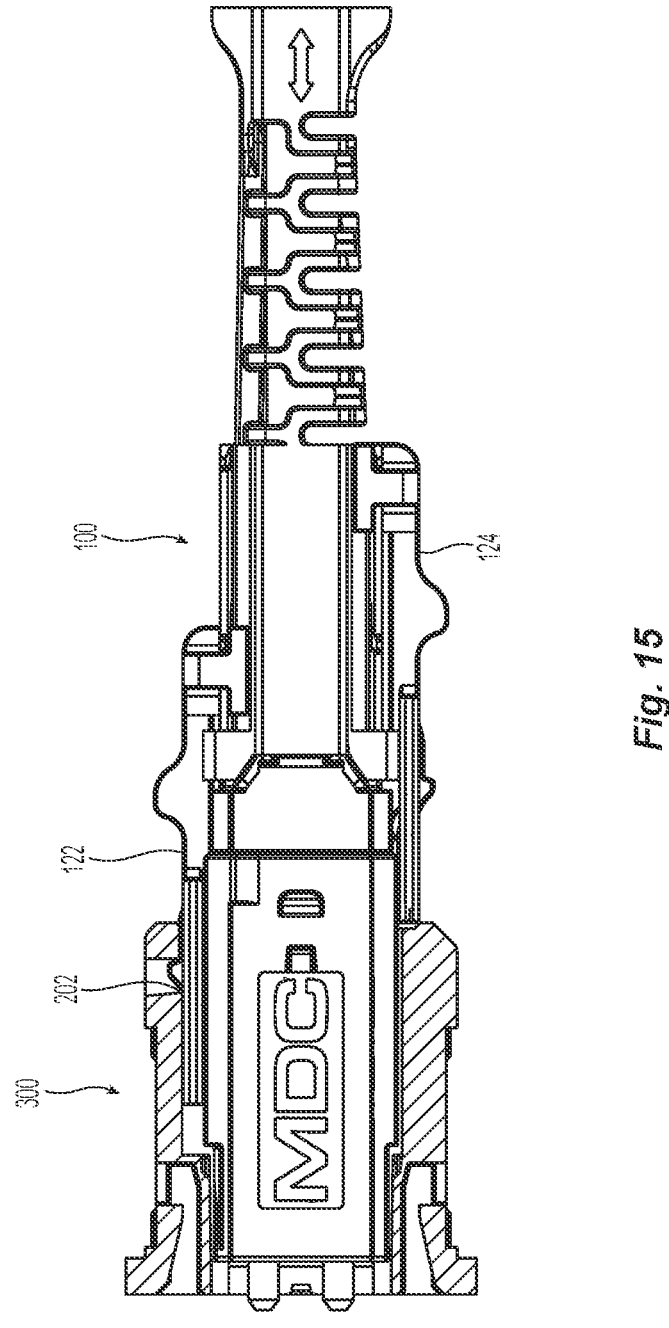
FIG. 15 is a cross-section elevation view of the VSFF fiber-optic connector and adapter/transceiver receptacle of FIG. 14.
Figure 16:
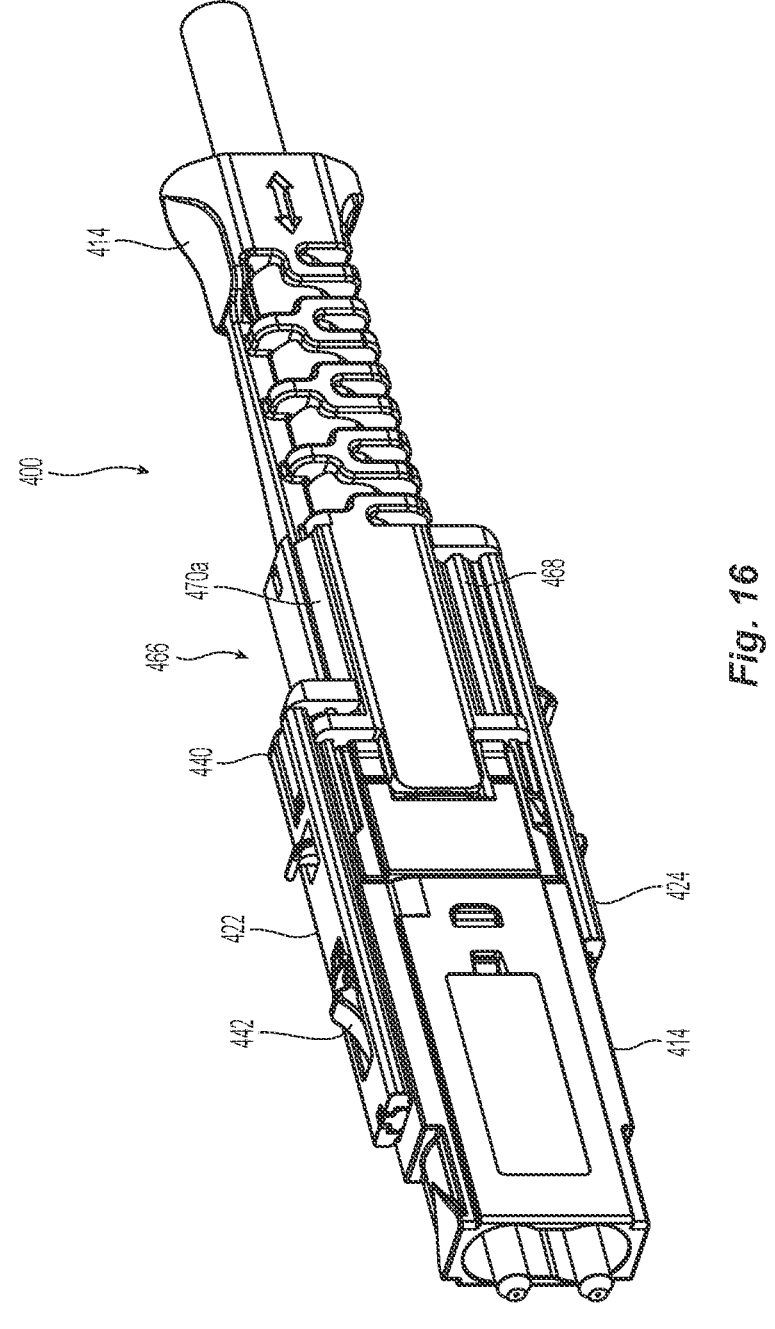
FIG. 16 is a perspective view of a second embodiment of a VSFF fiber-optic connector from the left front with two of the latch assemblies according to the present invention, one in an active position and one in an inactive position
Figure 17:
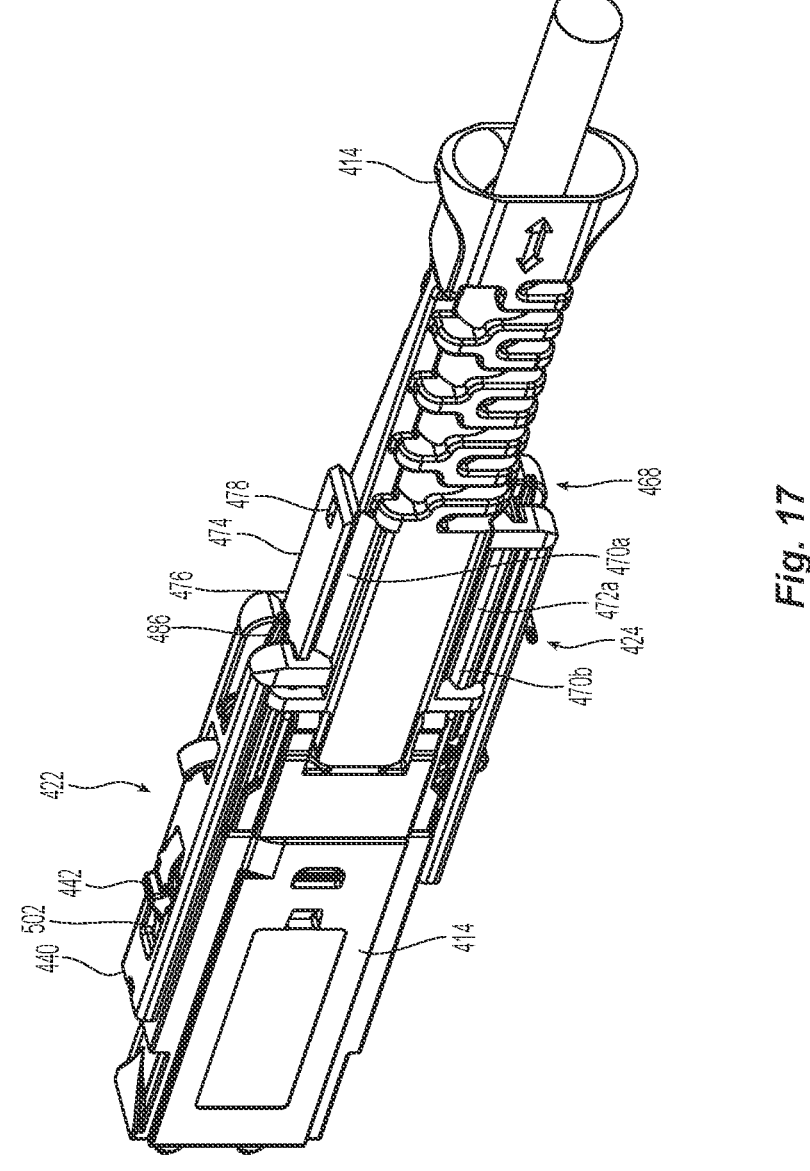
FIG. 17 is a perspective view of the VSFF fiber-optic connector of FIG. 16 from the left rear.
Figure 18:
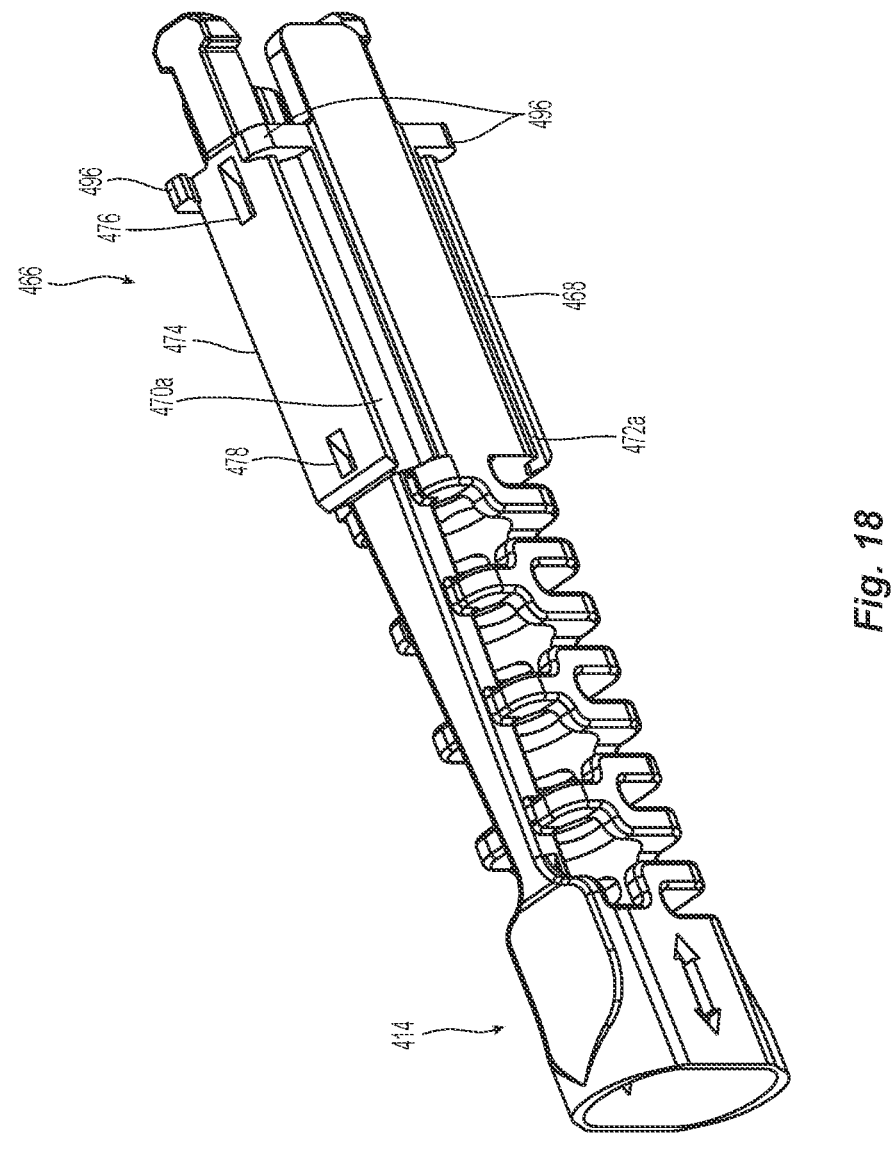
FIG. 18 is a perspective view of one embodiment of a boot that can be used with the VSFF fiber-optic connector of FIG. 16.
Figure 19:
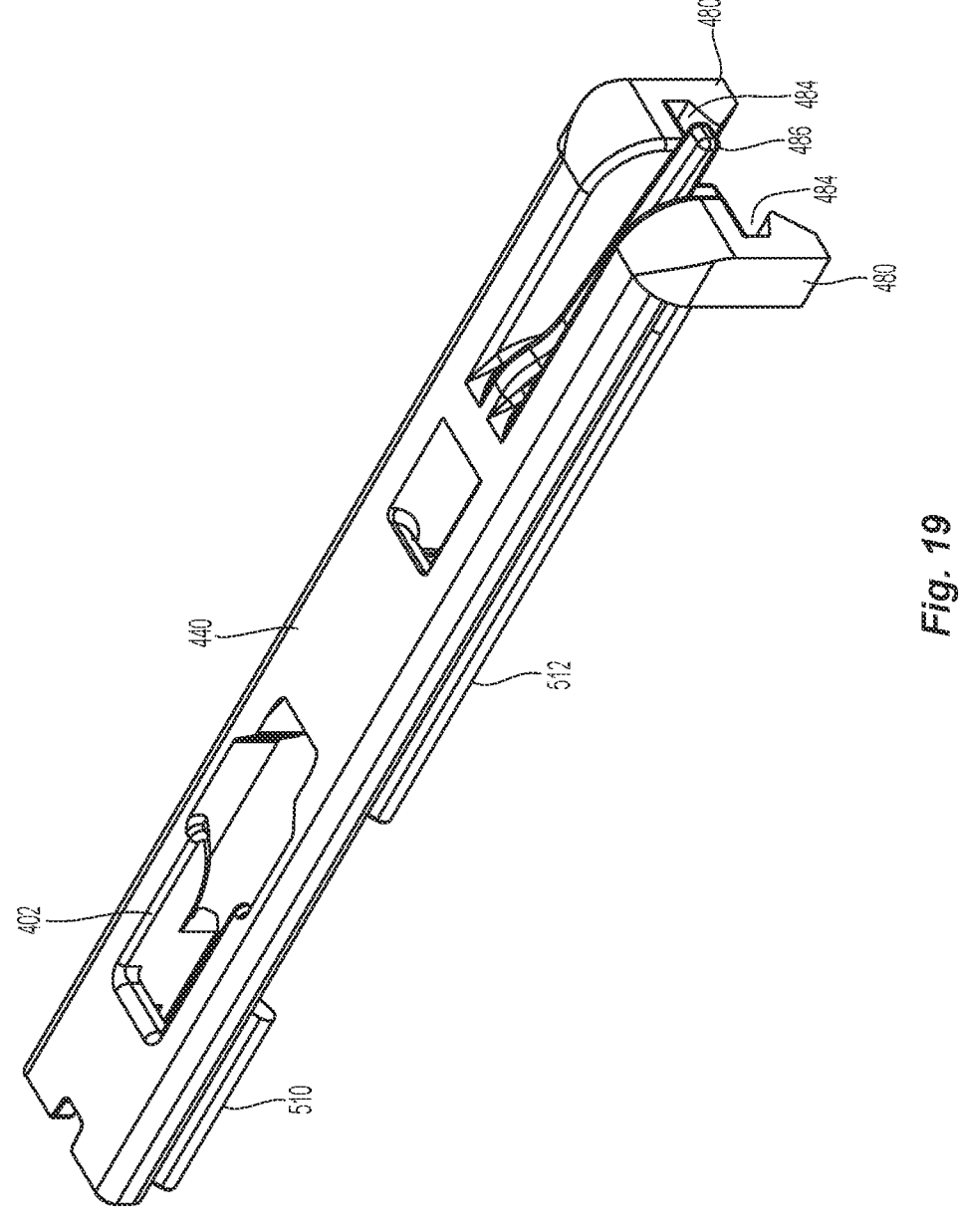
FIG. 19 is a perspective view from a top side of one embodiment of an assembly body, one part of the latch assembly, that can be used with the VSFF fiber-optic connector of FIG. 16.
Figure 20:
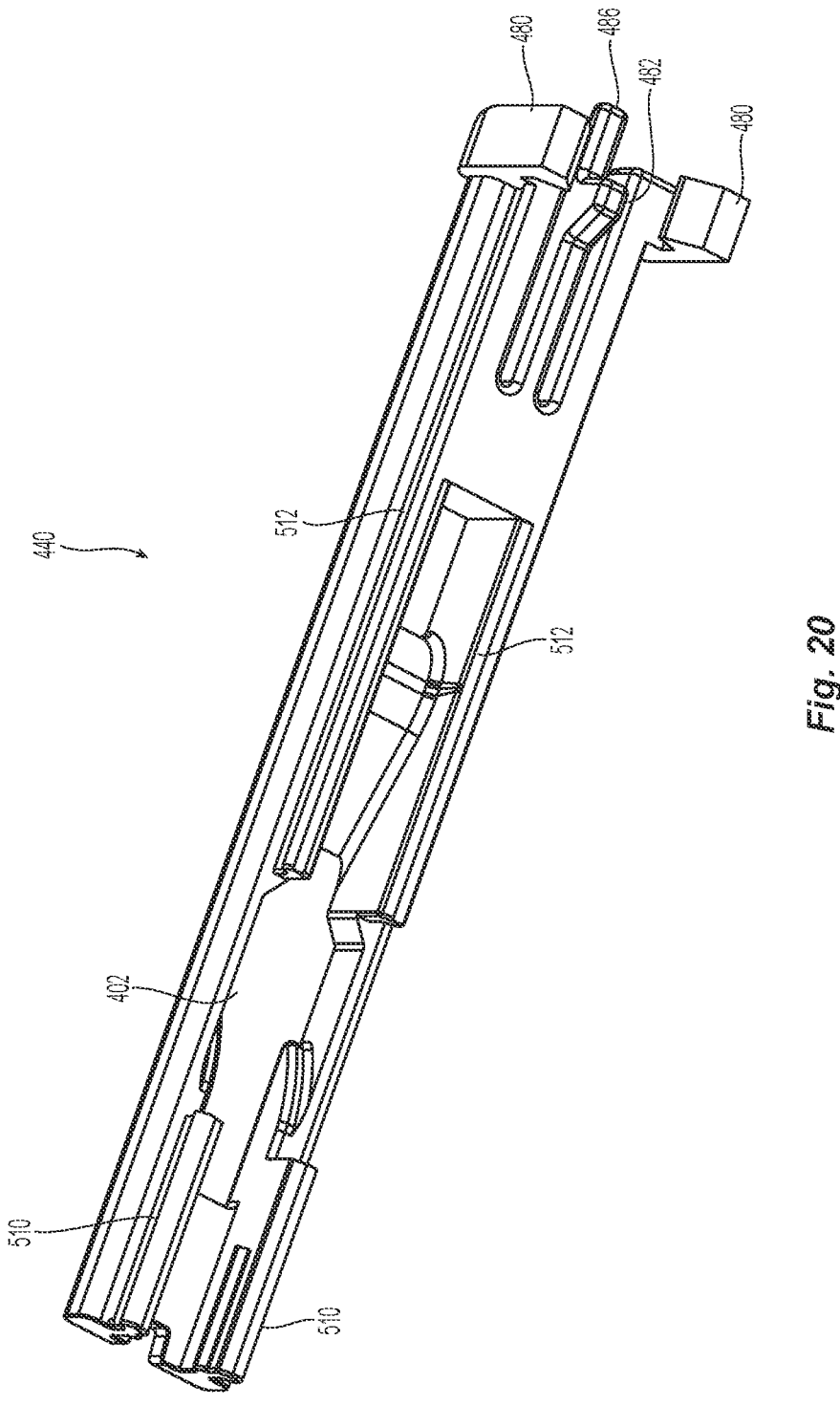
FIG. 20 is a perspective view from a bottom side of the assembly body of FIG. 19.

FIGS. 6 and 9 illustrate that the top latch assembly 122 is in the forward position and the bottom latch assembly 124 is in the rearward position. The forward position may interchangeably be referred to herein as a forward active position. Likewise, the rearward position may interchangeably be referred to herein as a rearward inactive position. The top front latches 190a,190b engage the rearward facing surface 224 of the projections 180 on the latch assembly 122. See FIG. 12. By pushing the top front latches 190a, 190b together and not on the rearward facing surface 224, the top latch assembly 122 can be moved rearwardly into an inactive position until it engages the top rear latches 192a, 192b. See FIG. 13. The bottom latch assembly 124 can be moved forward until the rearward facing surface 224 of the latch assembly 124 passes the bottom front latches 192a and in an active position. In this way, the polarity of the connector 100 is changed. At a given time, only one of the latch assemblies 122,124 is in the forward active position while the other of the latch assemblies 122,124 is in the rearward inactive position, and vice-versa. In FIG. 8, the top latch is forward in an active position, but the connector 100 has been flipped 180 degrees about the longitudinal axis LA. As can be seen in FIGS. 14 and 15, only one of the latch assemblies 122,124 is disposed within the adapter 300. In this case, it happens to be the latch assembly 122. The latch assembly 124 does not then enter the adapter 300. The adapter 300 could instead be other types of telecommunication structures to receive the connector 300. For example, a transceiver receptacle could instead be used.

Another embodiment of a very small form-factor (VSFF) fiber-optic connector 400 ("connector 400") according to the present invention is illustrated in FIGS. 16-23. In this embodiment, most components of the connector 400 are the same as connector 100. However, the latch assemblies 422,424 and the boot 414 are different.

The latch assemblies 422,424 still connect to the housing 414 through the rail receiving portion 460 receiving a front portion of the latch assemblies 422,424 and the first set of projections 510 that are towards the front of the assembly body 140. See FIGS. 19, 20 and 22. There is a second set of projections 512 rearward of the first set 510 and engage the clip 496 on the boot 114. However, the rear or proximal end of the latch body 442 is visible and is the structure on which the user pulls to release the connector 400 from the adapter 300. See, e.g., FIG. 23. There is no dome or projection as in the prior embodiment.

The boot 414 also has a different top side 466 and the bottom side 468 from the prior embodiment, although the top side 466 and the bottom side 468 are the same in connector 400. The boot 414 has two top boot rails 470a, 470b on the top side 466 and bottom boot rails 472a,472b on the bottom side 468 and along at least a portion of a length of the boot 414. See, e.g., FIGS. 16-18. These boot rails 470a,470b,472a,472b support and guide projections 480 of the latch assemblies 422,424. Above the boot rails 470a, 470b,472a,472b is a flat surface 474 that has a table-top cut out to engage the projections 480 of the latch assemblies 422,424. In particular, cut-outs 484 receive the edges of the flat surface 474 to assist in maintaining stability when the latch assemblies 422,424 are moved between the active and inactive positions. The flat surface 474 also has two openings, a first opening 476 near the front of the boot 414 and a second opening 478 farther back on the flat surface. The openings 476,478 are to receive the projection 482 from the cantilevered projection 486 on the latch assemblies 422,424 in the first (active) and second (inactive) positions, respectively. See FIG. 23.

Figure 21:
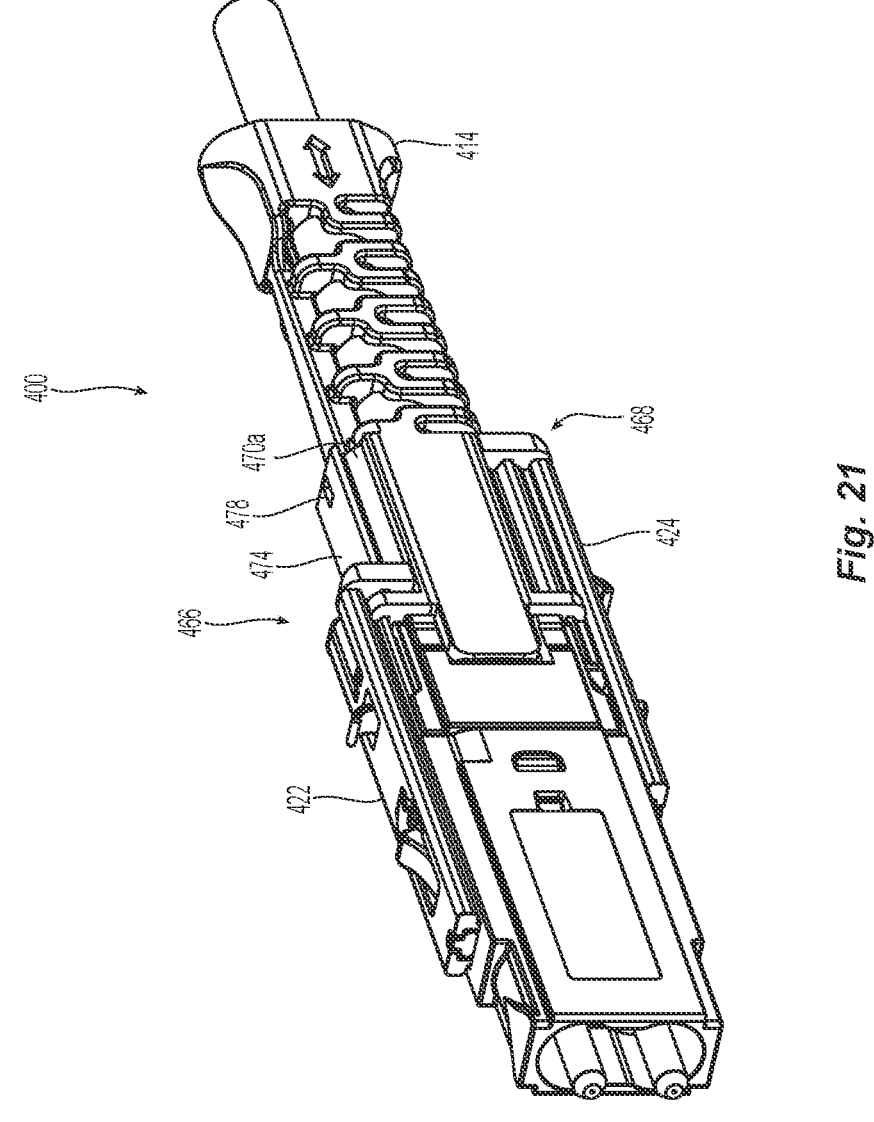
FIG. 21 is a left perspective view of the VSFF fiber-optic connector in FIG. 16 with a top latch assembly in an active position and a bottom latch assembly in an inactive position.
Figure 22:
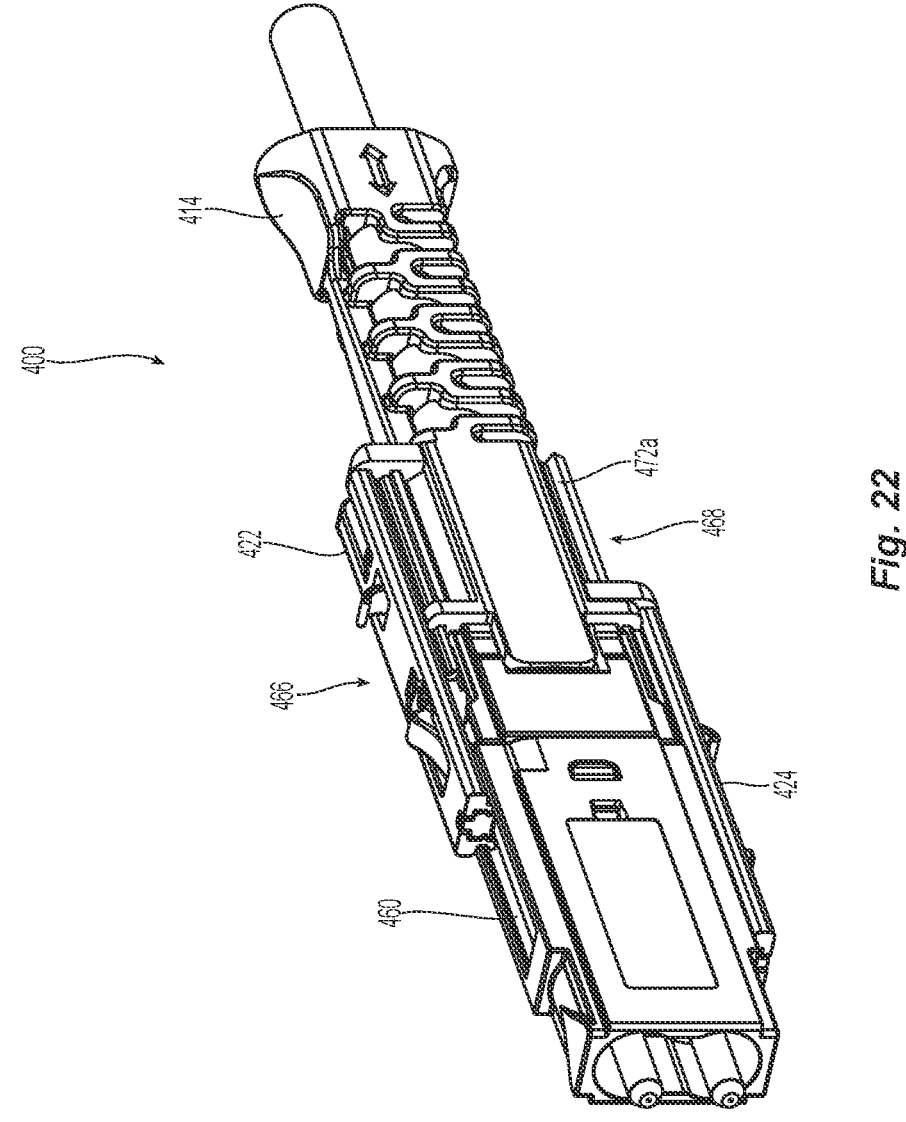
FIG. 22 is a left perspective view of the VSFF fiber-optic connector in FIG. 16 with the top latch assembly moved to an inactive position and a bottom latch assembly moved to an active position.
Figure 23:
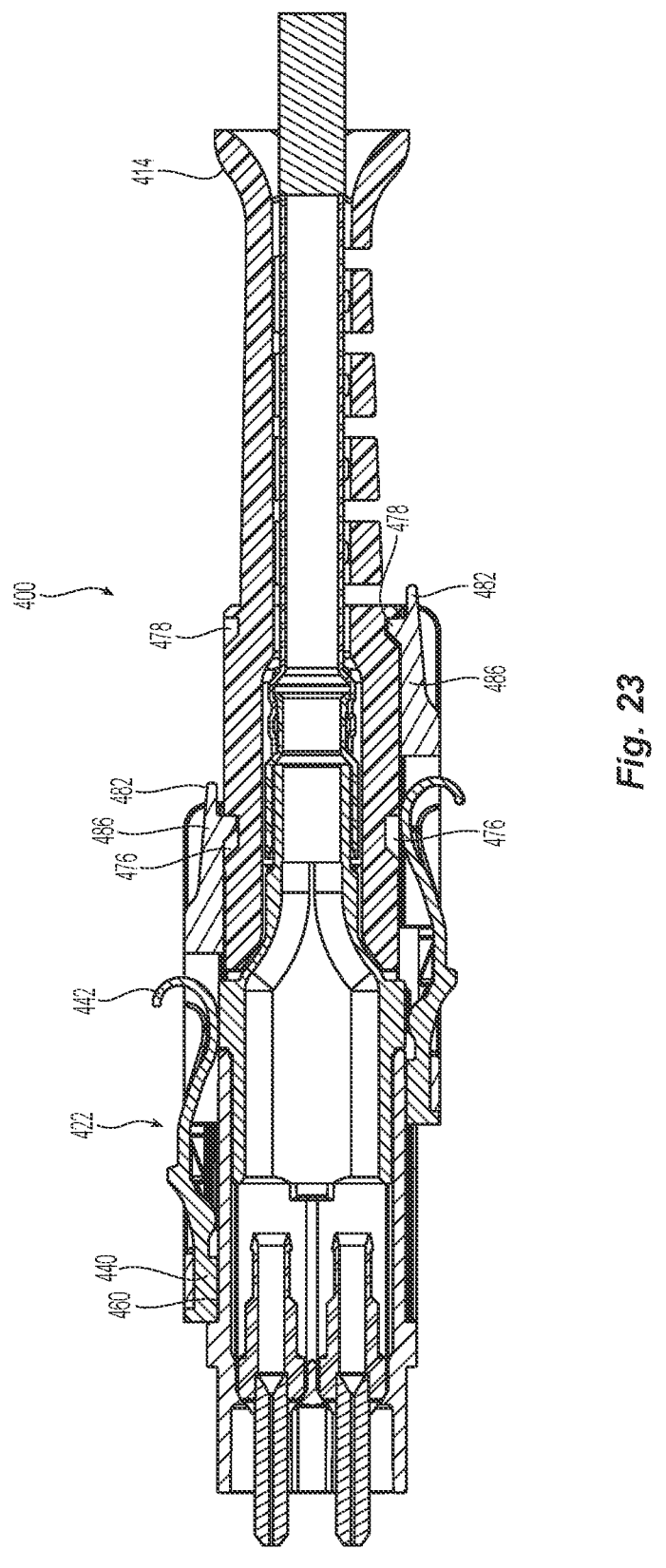
FIG. 23 is a cross section view of a portion of the VSFF fiber-optic connector of FIG. 16.

Turning to FIGS. 21 and 22, the connector 400 in FIG. 21 has the latch assembly 422 in the forward or active position and the latch assembly 424 in the rearward or inactive position. To move the latch assembly 422 from the active to the inactive position, the user need only pull up on the cantilevered projection 486 to move the projection 482 from the first opening 476 and slide the latch assembly 422 rearwards so that the projection 482 engages the second opening 478. Similarly, to move the latch assembly 424 from the inactive position to the active position, the user may pull up on the cantilevered projection 486 or simply push the latch assembly forward and the tapered surfaces will allow for the projection to move out of the opening 478 to move the projection 482 from the second opening 478 and slide the latch assembly 424 forwards so that the projection 482 engages the first opening 476. This results in the latch assemblies 422,424 being in the positions shown in FIG. 22. Again, under a normal usage, the latch assemblies 422,424 are not removable or not removed from contact with the connector 400 for polarity change.

Figure 24:
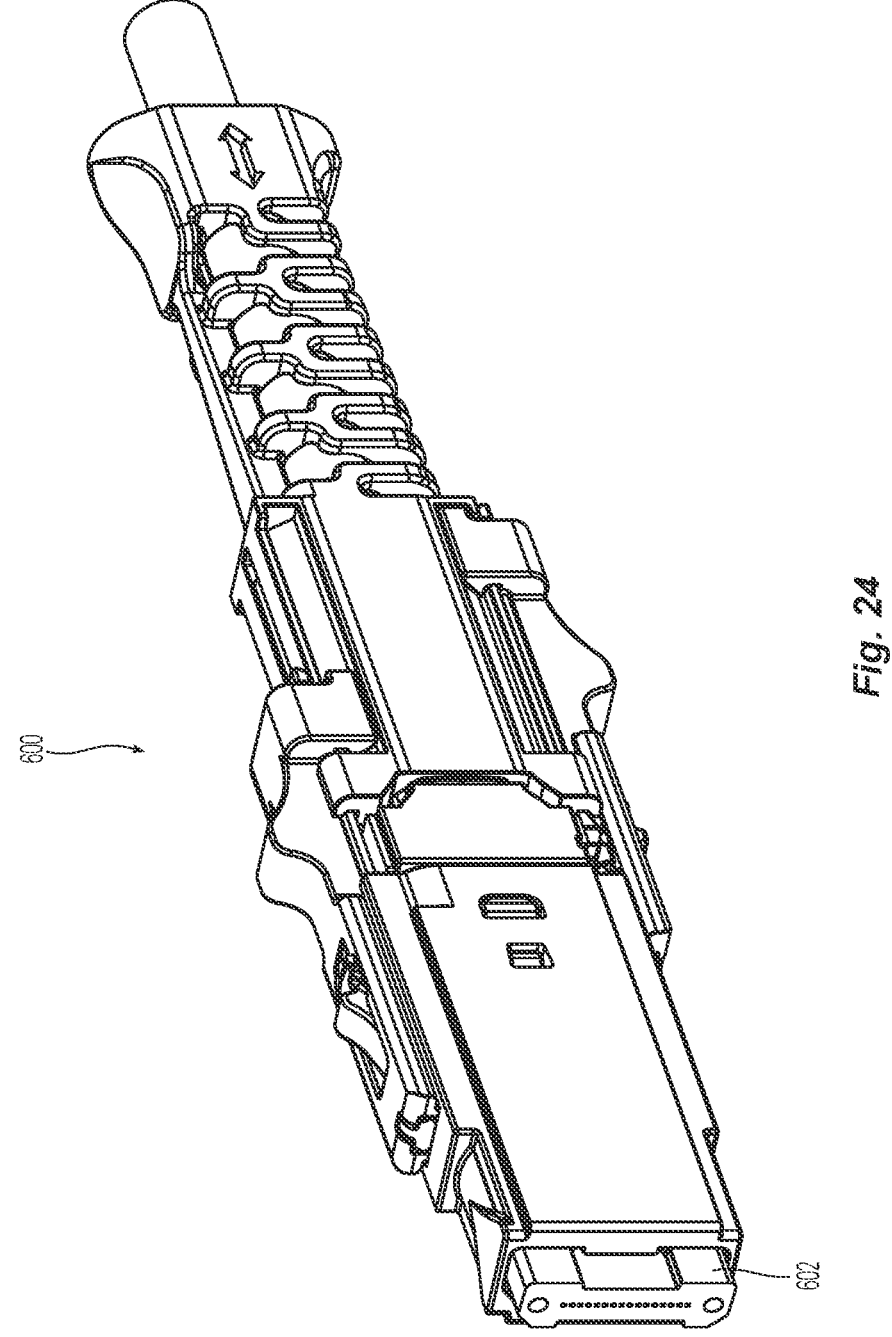
FIG. 24 is another embodiment of the VSFF fiber-optic connector with a multi-fiber fiber optic ferrule.

Another embodiment of a connector 600 is illustrated in FIG. 24—where the connector 600 has a single multi-fiber ferrule 602 rather than two single fiber ferrules 102. The operation of the connector 600 can be the same as either of the embodiments (100 or 400) above.

The components of the connectors 100,400, 600 may be shipped as a bag of parts for assembly into a finished connector. In some instances, only one of the latch assemblies 122,124 (or latch assemblies 422,424) may be shipped in the bag of parts and the connectors 100,400,600 would still function correctly. Upon identification of an incorrect polarity connection, an end user could then install other one of the latch assemblies 122,124 (or latch assemblies 422, 424) on the open side of the connectors 100,400, 600. As a result, there could be an optimization of how many components are shipped resulting in a smaller bag of parts since only one or a single latch assembly out of the latch assemblies 122,124 (or latch assemblies 422,424) needs to be shipped and assembled with the connectors 100,400, 600. The other latch assembly can be added later if needed, as described above.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A very small form-factor (VSFF) fiber-optic connector supporting at least two optical fibers, the VSFF fiber-optic connector comprising:

a housing having a main body formed by a top side, a bottom side, and two opposite side walls joining the top side to the bottom side, a separation between the top side and the bottom side being more than a separation between the two opposite side walls, the housing configured to receive the at least two optical fibers, the at least two optical fibers aligned along a fiber alignment axis equidistant from the two opposite side walls, the VSFF fiber-optic connector having a longitudinal axis;

a boot disposed rearward of the main body and having a top boot rail and a bottom boot rail along at least a portion of a length of the boot;

a first latch assembly slidably engaged with the top boot rail and the top side of the main body, wherein the first latch assembly is non-removable from the housing upon an assembly of the VSFF fiber-optic connector; and a second latch assembly slidably engaged with the bottom boot rail and to the bottom side of the main body, wherein the second latch assembly is also non-removable from the housing upon the assembly of the VSFF fiber-optic connector, and wherein each of the first latch assembly and the second latch assembly is movable between a forward active position and a rearward inactive position parallel to the longitudinal axis, and wherein when the first latch assembly is in the forward active position, the second latch assembly is in the rearward inactive position for a first polarity configuration of the VSFF fiber-optic connector, and vice-versa for a second polarity configuration of the VSFF fiber-optic connector.

2. The VSFF fiber-optic connector of claim 1, wherein in the forward active position, only one of the first latch assembly and the second latch assembly engages a telecommunications structure.

3. The VSFF fiber-optic connector of claim 2, wherein the telecommunications structure is an adapter or a transceiver receptacle.

4. The VSFF fiber-optic connector of claim 1, further comprising:

a first single fiber fiber-optic ferrule configured to support one of the at least two optical fibers; and a second single fiber fiber-optic ferrule configured to support the other one of the at least two optical fibers.

5. The VSFF fiber-optic connector of claim 1, wherein the first latch assembly and the second latch assembly each include projections to slidably engage the top boot rail and the bottom boot rail.

6. The VSFF fiber-optic connector of claim 1, wherein the boot includes a top front latch and a top rear latch positioned adjacent the top boot rail to engage the first latch assembly.

7. The VSFF fiber-optic connector of claim 6, wherein the boot further includes a bottom front latch and a bottom rear latch positioned adjacent the bottom boot rail to engage the second latch assembly.

8. The VSFF fiber-optic connector of claim 7, wherein a longitudinal motion of the first latch assembly between the forward active position and the rearward inactive position is limited by the top front latch and the top rear latch, and wherein a longitudinal motion of the second latch assembly between the forward active position and the rearward inactive position is limited by the bottom front latch and the bottom rear latch.

9. The VSFF fiber-optic connector of claim 6, wherein a longitudinal motion of the first latch assembly between the forward active position and the rearward inactive position is limited by the top front latch and the top rear latch.

10. The VSFF fiber-optic connector of claim 1, wherein the boot includes a forward facing surface to engage the housing and a rearward facing surface to engage the first latch assembly or the second latch assembly.

11. The VSFF fiber-optic connector of claim 1, wherein the first latch assembly has a top surface, the top surface having a projection to receive an external force for a movement between the forward active position and the rearward inactive position or vice-versa.

12. The VSFF fiber-optic connector of claim 1, wherein the boot includes a first center channel between two rails of the top boot rail, the center channel configured to receive a guidance tab on a rear portion of the first latch assembly.

13. The VSFF fiber-optic connector of claim 12, wherein the boot includes a second center channel between two rails of the bottom boot rail, the second center channel configured to receive a guidance tab from a rear portion of the second latch assembly.

14. The VSFF fiber-optic connector of claim 1, further comprising a multi-fiber fiber optic ferrule configured to support the at least two optical fibers.

15. A very small form-factor (VSFF) fiber-optic connector supporting at least two optical fibers, the VSFF fiber-optic connector comprising:

a housing having a main body formed by a top side, a bottom side, and two opposite side walls joining the top side to the bottom side, the main body having an opening extending along a longitudinal axis between a front end and a rear end of the main body to receive the at least two optical fibers, a separation between the top side and the bottom side being more than a separation between the two opposite side walls, the at least two optical fibers stacked vertically between the top side and the bottom side of the main body;

a boot engaged with the rear end of the main body and having at least one boot rail along at least a portion of a length of the boot, the boot being bendable in a direction away from the longitudinal axis;

at least one latch assembly slidably engaged with the at least one boot rail and to at least one of the top side or the bottom side of the main body on a same side as the at least one boot rail, wherein the at least one latch assembly is non-removable from the housing upon an assembly of the VSFF fiber-optic connector, wherein the at least one latch assembly is movable between a forward active position and a rearward inactive position along the longitudinal axis, without removal of the at least one latch assembly from the VSFF fiber-optic connector, and 15wherein in the forward active position the at least one latch assembly is configured to engage an adapter or a transceiver receptacle, wherein the at least one latch assembly includes a first latch assembly and a second latch assembly, and wherein each of the first latch assembly and the second latch assembly is respectively movable between the forward active position and the rearward inactive position along the longitudinal axis, and wherein when the first latch assembly is in the forward active position, the second latch assembly is in the rearward inactive position for a first polarity configuration of the VSFF fiber-optic connector, and vice-versa for a second polarity configuration of the VSFF fiber-optic connector.

16. The VSFF fiber-optic connector of claim 15, wherein the at least one latch assembly includes only a single latch assembly.

17. The VSFF fiber-optic connector of claim 15, wherein the VSFF fiber-optic connector is a duplex fiber optic connector having two single fiber ferrules to support two optical fibers, respectively.

18. A bag of parts for assembling a very small form-factor (VSFF) duplex fiber-optic connector, the bag of parts comprising:

a housing having a main body formed by a top side, a bottom side, two opposite side walls joining the top side to the bottom side, and an opening, a separation between the top side and the bottom side being more than a separation between the two opposite side walls, the opening configured to receive at least two optical fibers, the at least two optical fibers upon an assembly of the VSFF duplex fiber-optic connector are aligned along a fiber alignment axis to be equidistant from the two opposite side walls;

a boot configured to engage the main body upon the assembly and having a top boot rail and a bottom boot rail along a portion of a length of the boot, each of the top boot rail and the bottom boot rail having two rails and a center channel between the two rails; and a first latch assembly having a guidance tab for slidable non-removable engagement with one of the top boot rail or the bottom boot rail and to at least one of the top side or the bottomside of the main body, wherein the first latch assembly being non-removable from the housing upon an assembly of the VSFF duplex fiber-optic connector, wherein upon the assembly of the VSFF duplex fiber-optic connector, the first latch assembly is movable between a forward active position and a rearward inactive position along a longitudinal axis, without removal from the VSFF duplex fiber-optic connector, and wherein the boot includes a top front latch and a top rear latch positioned between the two rails of the top boot rail to engage the first latch assembly, and a second latch assembly identical to the first latch assembly for a non-removable placement on the top side or the bottom side of the main body upon identification of an incorrect polarity configuration of the assembled VSFF duplex fiber-optic connector.

* * * * *